United States Patent
Yokota et al.

(10) Patent No.: US 10,513,236 B2
(45) Date of Patent: Dec. 24, 2019

(54) ENERGY ABSORBING MEMBER

(71) Applicant: UACJ CORPORATION, Tokyo (JP)

(72) Inventors: Tomoya Yokota, Tokyo (JP); Yutaka Yamada, Tokyo (JP); Yoshiharu Sakai, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 15/777,822

(22) PCT Filed: Dec. 22, 2016

(86) PCT No.: PCT/JP2016/088524
§ 371 (c)(1),
(2) Date: May 21, 2018

(87) PCT Pub. No.: WO2017/111105
PCT Pub. Date: Jun. 29, 2017

(65) Prior Publication Data
US 2018/0370468 A1 Dec. 27, 2018

(30) Foreign Application Priority Data
Dec. 24, 2015 (JP) ................................. 2015-252084

(51) Int. Cl.
*B60R 19/34* (2006.01)
*B60R 19/18* (2006.01)
(Continued)

(52) U.S. Cl.
CPC ............. *B60R 19/18* (2013.01); *B60R 19/34* (2013.01); *B62D 21/15* (2013.01); *B62D 29/008* (2013.01);
(Continued)

(58) Field of Classification Search
CPC .... F02N 15/046; F02N 15/063; Y10T 74/137; Y10T 74/131; E21B 17/07;
(Continued)

(56) References Cited

U.S. PATENT DOCUMENTS 4,352,484 A * 10/1982 Gertz ..................... E01F 15/146
256/13.1
5,059,056 A * 10/1991 Banthia .............. A47B 47/0008
296/203.01
(Continued)

FOREIGN PATENT DOCUMENTS

| CN | 101360634 A | 2/2009 |
| CN | 101734287 A | 6/2010 |

(Continued)

OTHER PUBLICATIONS

Int'l. Search Report issued in Int'l. App. No. PCT/JP2016/088524, dated Jan. 31, 2017.
(Continued)

*Primary Examiner* — Kiran B Patel
(74) *Attorney, Agent, or Firm* — Greer Burns & Crain Ltd.

(57) ABSTRACT

An energy absorbing member (20) is formed of an aluminum alloy extruded material having a substantially quadrangular outer shape. Straight portions of a pair of long sides of a quadrangular shape are each segmented into three side walls (21a, 21b, 21c) by two arcuate internal projections (26) that project inward. Vertices of opposing internal projections (26) are joined by a rib (25). Accordingly, the energy absorbing member (20) is configured to have a shape in which three cylindrical portions having hollow portions (24a, 24b, 24c) are joined. Arc-shaped internal projections (23) that each project inward are provided in four corners of the quadrangular shape.

6 Claims, 32 Drawing Sheets

(51) Int. Cl.
  *B62D 21/15* (2006.01)
  *F16F 7/00* (2006.01)
  *F16F 7/12* (2006.01)
  *B62D 29/00* (2006.01)

(52) U.S. Cl.
  CPC ............... *F16F 7/00* (2013.01); *F16F 7/12* (2013.01); *B60R 2019/182* (2013.01)

(58) Field of Classification Search
  CPC .... A61F 2002/30433; A61F 2220/0041; A61F 2/66; A61F 2002/5055; A61F 2002/6657
  USPC .......................................................... 293/133
  See application file for complete search history.

(56) References Cited

U.S. PATENT DOCUMENTS

| | | | | |
|---|---|---|---|---|
| 5,772,267 | A * | 6/1998 | Heim | B60R 19/34 293/132 |
| 6,179,355 | B1 * | 1/2001 | Chou | B60R 19/18 188/377 |
| 6,221,930 | B1 * | 4/2001 | Tada | B60R 21/04 248/560 |
| 6,371,540 | B1 * | 4/2002 | Campanella | B60R 19/18 293/102 |
| 8,336,360 | B1 * | 12/2012 | Lee | B21D 17/02 72/370.04 |
| 9,187,127 | B2 * | 11/2015 | Tyan | B62D 21/152 |
| 9,789,906 | B1 * | 10/2017 | Tyan | B60R 19/34 |
| 9,840,281 | B2 * | 12/2017 | Tyan | B62D 21/152 |
| 9,889,887 | B2 * | 2/2018 | Tyan | B60R 19/26 |
| 9,944,323 | B2 * | 4/2018 | Tyan | B62D 21/15 |
| 10,279,842 | B2 * | 5/2019 | Tyan | B62D 25/00 |
| 10,300,947 | B2 * | 5/2019 | Tyan | B62D 21/00 |
| 10,315,698 | B2 * | 6/2019 | Tyan | B62D 21/15 |
| 2002/0158384 | A1 * | 10/2002 | Beck | B60R 19/34 267/139 |
| 2003/0218326 | A1 * | 11/2003 | Banyas | F16F 7/121 280/777 |
| 2004/0135382 | A1 * | 7/2004 | Sakuma | B60R 19/34 293/102 |
| 2005/0104392 | A1 * | 5/2005 | Liebhard | B60R 19/18 293/132 |
| 2007/0113406 | A1 * | 5/2007 | Sucke | F16F 7/121 29/897.1 |
| 2008/0217935 | A1 * | 9/2008 | Braunbeck | B60R 19/34 293/132 |
| 2009/0026799 | A1 * | 1/2009 | Gavrilov | B62D 21/15 296/187.05 |
| 2010/0127531 | A1 | 5/2010 | Yasuhara et al. | |
| 2011/0015902 | A1 * | 1/2011 | Cheng | B62D 21/152 703/1 |
| 2011/0049916 | A1 * | 3/2011 | Nakanishi | B60R 19/34 293/133 |
| 2012/0112479 | A1 * | 5/2012 | Nagwanshi | B60R 19/34 293/133 |
| 2013/0001964 | A1 * | 1/2013 | Freundl | B60R 19/18 293/133 |
| 2013/0127191 | A1 * | 5/2013 | Zannier | B60R 19/03 293/133 |
| 2014/0049059 | A1 * | 2/2014 | Kutscher | B60R 19/18 293/120 |
| 2014/0203592 | A1 * | 7/2014 | Nagwanshi | B62D 29/004 296/187.01 |
| 2015/0021938 | A1 * | 1/2015 | Bryer | B60R 19/34 293/132 |
| 2015/0021939 | A1 * | 1/2015 | Bryer | B60R 19/18 293/132 |
| 2015/0021940 | A1 * | 1/2015 | Roselli | B60R 19/34 293/133 |
| 2015/0151698 | A1 * | 6/2015 | Lee | B60R 19/18 293/120 |
| 2016/0001726 | A1 | 1/2016 | Keller et al. | |
| 2016/0129865 | A1 * | 5/2016 | Mankame | B62D 25/105 296/187.05 |
| 2016/0200271 | A1 * | 7/2016 | Steinhilb | B60R 19/18 293/132 |
| 2016/0207494 | A1 * | 7/2016 | Hector, Jr. | B60R 21/34 |
| 2016/0264083 | A1 * | 9/2016 | Ishitsuka | B60R 19/34 |
| 2017/0158252 | A1 * | 6/2017 | Milne | B60R 21/04 |
| 2017/0307137 | A1 * | 10/2017 | Tyan | B32B 3/12 |
| 2017/0307138 | A1 * | 10/2017 | Tyan | F16S 1/02 |
| 2017/0320455 | A1 * | 11/2017 | Nakayama | B62D 21/152 |
| 2018/0057060 | A1 * | 3/2018 | Tyan | B62D 21/15 |
| 2018/0058530 | A1 * | 3/2018 | Tyan | F16F 7/121 |
| 2018/0099475 | A1 * | 4/2018 | Tyan | B32B 5/18 |
| 2018/0100621 | A1 * | 4/2018 | Tyan | B32B 5/18 |
| 2018/0297098 | A1 * | 10/2018 | Kerr | B21D 22/025 |

FOREIGN PATENT DOCUMENTS

| | | |
|---|---|---|
| CN | 104995064 A | 10/2015 |
| JP | 2002225651 A | 8/2002 |
| JP | 2006207724 A | 8/2006 |
| JP | 2006207725 A | 8/2006 |
| JP | 2010018047 A | 1/2010 |
| JP | 2010125884 A | 6/2010 |
| JP | 2010169109 A | 8/2010 |

OTHER PUBLICATIONS

Office action issued in related Chinese patent application No. 201680062202.6, dated Jun. 28, 2019 (with English translation).

* cited by examiner

ENERGY ABSORBING MEMBER

This is a National Phase Application filed under 35 U.S.C. § 371, of International Application No. PCT/JP2016/088524, filed Dec. 24, 2015, the contents of which are incorporated by reference.

TECHNICAL FIELD

The present disclosure relates to an energy absorbing member.

BACKGROUND ART

Bumper structures to absorb shocks at the time of impact are mainly equipped on the front and rear of an automobile. The bumper structure generally includes a reinforcement and an impact absorbing member. The bumper structure receives a shock at the reinforcement, and has a structure that suppresses damage to the car body by deformation of an energy absorbing member that absorbs the impact energy.

Many materials and shapes for improving the impact absorbing performance of energy absorbing members have been developed so far.

Patent Literature 1 discloses an energy absorbing member formed as an aluminum extruded member that has a cruciform inner wall having a substantially quadrangular cross section in a direction of compression and connecting two pairs of outer walls, wherein a portion connecting the outer walls and the inner wall is an internal projection.

Patent Literature 2 discloses a shock absorbing member structure which has a substantially quadrangular cross section and in which an internally projecting portion is disposed at an outer wall having a substantially quadrangular shape, and which is formed in such a way that adjustment of a plastic moment allows the shock absorbing member to repeatedly buckle and deform even when an oblique load is applied thereto.

CITATION LIST

Patent Literatures

Patent Literature 1: Unexamined Japanese Patent Application Kokai Publication No. 2010-169109
Patent Literature 2: Unexamined Japanese Patent Application Kokai Publication No. 2006-207724

SUMMARY OF INVENTION

Technical Problem

The impact absorbing performance required for the energy absorbing member is such that when the impact load is applied in the axial direction and/or in the oblique direction, the energy absorbing member buckles repeatedly and stably in the axial direction to deform in the form of a bellows, the average load at the time of collapse is high, and the maximum reaction force generated during collapse is suppressed to such a range as not to destroy other constituent members disposed in the vicinity of the energy absorbing member. Since reducing the weight of the energy absorbing member is essential to reduce the environmental burden of automobiles, an aluminum expanded material is important.

The subject matters of Patent Literature 1 and Patent Literature 2 are both focused on increasing the amount of absorbed energy as much as possible. However, it is particularly desirable that an energy absorbing member which is excellent in the aforementioned impact absorbing performance since the initial stage of impact be used as the bumper structure of an automobile.

In view of the foregoing problem, it is an objective of the present disclosure to provide an energy absorbing member that demonstrates an excellent impact absorbing performance since the initial stage of impact.

Solution to Problem

To achieve the objective, an energy absorbing member according to the present disclosure includes: a joined cylindrical body formed of an aluminum alloy material, the joined cylindrical body including, in a cross section perpendicular to an axial direction of the aluminum alloy material, a substantially quadrangular outer wall, arcuate first internal projections projecting inward from four corners of the outer wall, arcuate second internal projections projecting inward to segment each of straight portions of a pair of long sides of the outer wall into a plurality of sides, and ribs that join vertices of the second internal projections opposing each other, wherein when applied with a compressive load in the axial direction, the joined cylindrical body buckles and deforms continuously.

The joined cylindrical body may further include a third internal projection that is a part of the outer wall projecting inward, and the third internal projection may be located at a position of a wavelength which is ½ to one times a wavelength of an initial buckling from one end face of the outer wall, which serves as a compression surface, in the axial direction, and may extend in a widthwise direction perpendicular to the axial direction.

A distance between the ribs adjacent to each other may be greater than a distance between straight portions of short sides of the outer wall and the ribs.

A radius of an arc of the first internal projection may be larger than a radius of an arc of the second internal projection.

One of end portions of the joined cylindrical body in the axial direction may be sealed.

A flange portion may be formed at the one of end portions in the axial direction.

Advantageous Effects of Invention

The present disclosure provides an energy absorbing member having an excellent impact absorbing performance since the initial stage of impact.

DESCRIPTION OF EMBODIMENTS

The following describes exemplary embodiments of the present disclosure with reference to the accompanying drawings.

Figure 2:
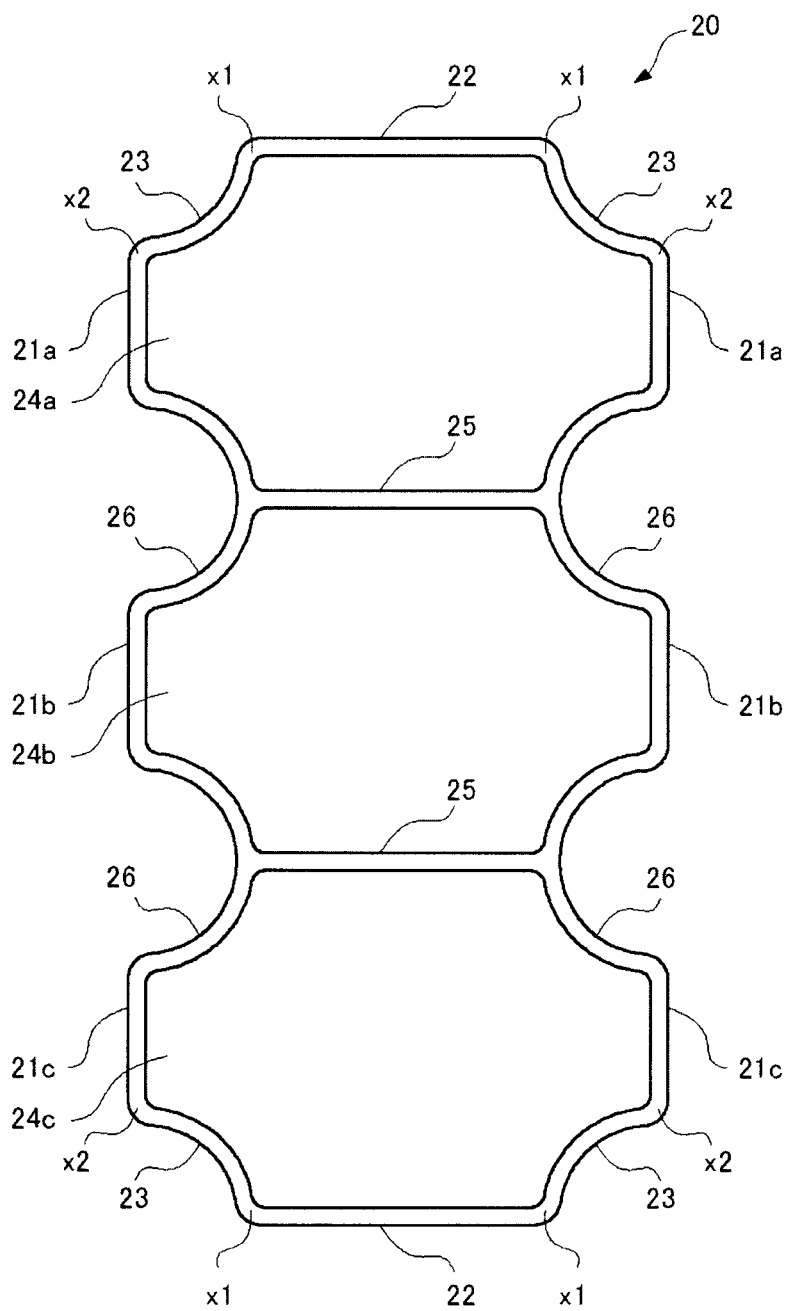
FIG. 2 is a front view of the energy absorbing member according to the Embodiment 1.

In the following description of each energy absorbing member, a front view as shown in FIG. 2 is viewed from the side of a rigid wall 110 in FIG. 3. However, in the examples described herein, the shape of an end face on the rigid wall 110 side is the same as the shape of an end face on the rigid wall 120 side. Unless otherwise specified, a sectional shape cut perpendicularly to an axial direction of the energy absorbing member is identical to the shape of the end face in the front view.

Embodiment 1

Figure 1:
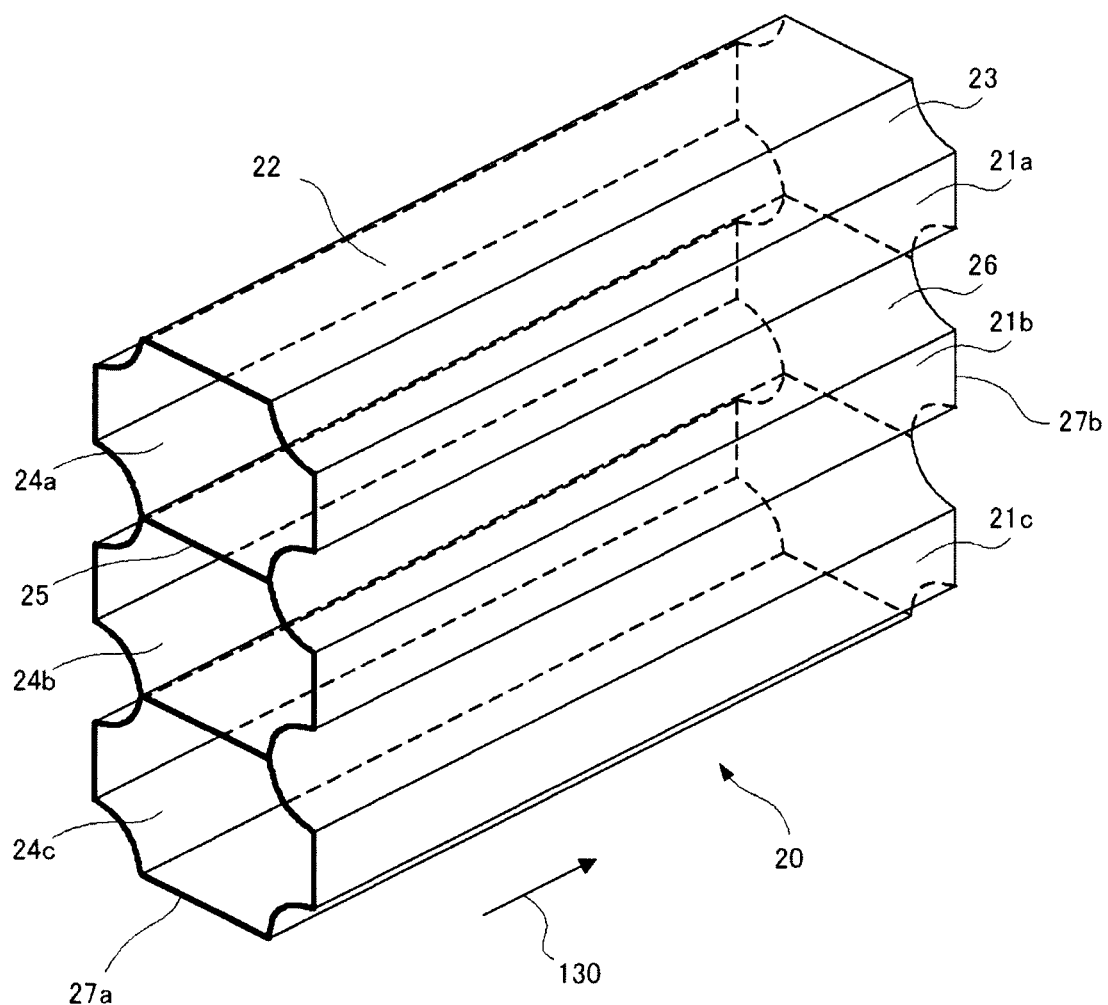
FIG. 1 is a perspective view illustrating an energy absorbing member according to Embodiment 1 of the present disclosure.
Figure 3:
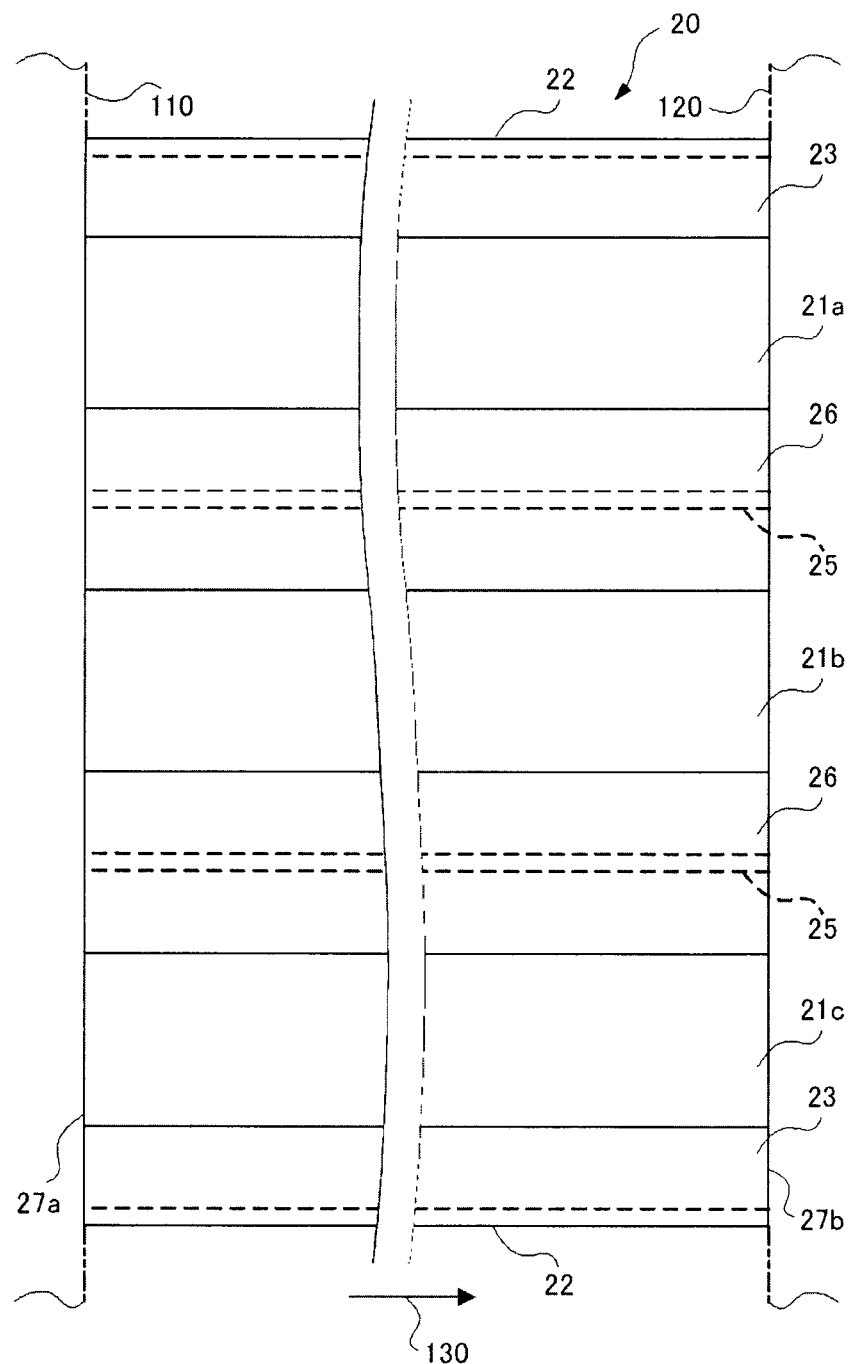
FIG. 3 is a side view of the energy absorbing member according to the Embodiment 1.

FIGS. 1 to 3 illustrate an energy absorbing member according to Embodiment 1.

An energy absorbing member 20 is configured to have a substantially quadrangular outline when viewed from the front. Each long side of the quadrangle is divided into three side walls 21a, 21b, and 21c by internal projections 26 at two locations for each side. The short sides of the quadrangle corresponds to side walls 22. Four internal projections 23 projecting inward are respectively provided at the four corners of the quadrangle. The two pairs of internal projections 26 opposing each other on the right and left in the figure are joined by ribs 25, respectively. Accordingly, the energy absorbing member 20 according to the Embodiment 1 is configured as a joined cylindrical body having three cylindrical portions joined together.

The internal projections 26 are located between the side wall 21a and the side wall 21b, and between the side wall 21b and the side wall 21c, and each have a semicircular shape facing inward of a substantially quadrangle of the basic structure.

The ribs 25 are provided so as to join the semicircular vertices of a pair of internal projections 26. Therefore, the substantially quadrangular shape is partitioned by two ribs 25 to form three hollow portions 24a, 24b, and 24c. In the Embodiment 1, the ribs 25 are provided at locations where the width of the energy absorbing member 20 is divided into approximately three equal parts in the lengthwise direction of the quadrangular shape, that is, in the vertical direction in FIG. 2. Accordingly, the energy absorbing member 20 has a form in which three cylindrical portions respectively surrounding the hollow portions 24a, 24b, and 24c are joined.

The side walls 21a, 21b, and 21c, the side walls 22, the internal projections 23, the ribs 25, and the internal projections 26 all have substantially the same thickness. In addition, the joint portions of the individual parts are rounded with a predetermined roundness.

The shape of such an energy absorbing member 20 may be manufactured as an expanded material, for example, an extruded material of an aluminum alloy. A method of manufacturing the aluminum extruded material is not particularly limited. The material in use, which is also not particularly limited, is preferably, a 6000-based aluminum alloy from the viewpoint of strength and buckling deformation. In the embodiments and examples herein, the extruded material and the quality of the material are the same for energy absorbing members to be described later.

As shown in FIG. 3, the energy absorbing member 20 according to the Embodiment 1 is sandwiched between the rigid wall 110 and the rigid wall 120. An end face 27a and an end face 27b in the lengthwise direction of the energy absorbing member 20 are respectively joined to the rigid wall 110 and the rigid wall 120 by welding or the like.

The rigid wall 110 and the rigid wall 120 may be members such as a frame of a vehicle or a flange or the like for attaching the energy absorbing member 20 to the vehicle. Both the rigid wall 110 and the rigid wall 120 may be formed of an aluminum alloy suitable for the illustrated structure, but have sufficiently high rigidity in a compressing direction 130 with respect to the energy absorbing member 20. In the Embodiment 1, the rigid wall 110 corresponds to the reinforcement member of a bumper structure for the vehicle, and the rigid wall 120 corresponds to the vehicle body frame. Therefore, when the vehicle collides with another vehicle or the like, the energy absorbing member 20 is compressed in the compressing direction 130 indicated by an arrow. In the following description, a direction parallel to the compressing direction 130 is referred to as an axial direction of each energy absorbing member.

The following describes the reasons for adopting the shape of the Embodiment 1. For the reasons given below, the energy absorbing member 20 according to the Embodiment 1 has a suitable absorbing performance in the axial direction.

The reason for the end face (in cross section) of the energy absorbing member 20 to be quadrangular is that the cross-sectional shape perpendicular to the to-and-fro direction of the chassis of the automobile is generally substantially quadrangular, so that the impact absorbing member (energy absorbing member 20) is also shaped substantially like a quadrangle.

The reason for dividing the long side of the quadrangular peripheral wall into three sides is to cause buckling deformation at an early stage. With the shape of the related art, when compression is applied in the axial direction, the side surface of the impact absorbing member has only four corners which are angular, that is, there are few locations of high stress, so that the energy absorbing member does not achieve buckling deformation to efficiently absorb impact. In the present disclosure, providing the internal projections 26 for segmenting the long side of the quadrangle makes it possible to accelerate the stress propagation toward the internal projections 23, namely, the four corners, so that excellent buckling deformation can be achieved. In addition, increasing the number of locations where high stress (stress serving as the origin of buckling) is applied may assure stable buckling deformation.

The following are the reasons for making the arcuate projections.

(1) For example, when comparing a shape having a point x1 and an adjacent point x2 in FIG. 2 joined by a straight line with a shape having the points joined by an arc as in the present disclosure, the shape of the present disclosure provides projections with a larger cross-sectional area. This ensures buckling deformation under a high load, as compared with the shape having the points joined by a straight line.

(2) For example, for the shape having two points x2 corresponding to a pair of long side portions in FIG. 2 joined by a straight line, segmentation of the long side portion becomes insufficient so as to cause buckling deformation with one side defined by a straight side portion (x2-x2) and an arcuate portion (x1-x2) as one side. For the shape having the joint port provided by arcs (internal projections 26), by way of contrast, buckling deformation is achieved with one side at each of the straight side portion and the arcuate portion of the long side portion (one of the side walls 21a, 21b, and 21c, and the adjacent internal projections 23 or the internal projections 26). As a result, it is possible to efficiently absorb the impact on the entire surface. Further, the side side length of the straight side portion is shortened by the radius of the arc of the internal projection 26 (and the internal projection 23), which can accelerate the stress propagation to the corner portions, and also accelerate the stress propagation to the entire surface, making it possible to achieve early and continuous buckling deformation more stably.

(3) Providing arcuate projections achieves excellent manufacture of an extruded material as compared with linear projections. At the time of extrusion molding, the projections and recesses having sharp angles leads to stress concentration on the extruded material itself and wearing of the metal mold, so that the shape without edges as in the Embodiment 1 facilitates extrusion molding.

(4) Providing the arcuate internal projections 23 makes it possible to provide sides that can achieve fine buckling deformation within limited space, and that, in combination with the aforementioned segmented long sides, achieves high-load and fine deformation since the initial stage of impact.

Providing the ribs 25 joining the vertices of the internal projections 26 makes it possible to increase the number of points where high stress occurs, and achieve stable buckling deformation.

Although the diameter of the arc of the internal projection 23 is substantially equal to the diameter of the arc of the internal projection 26 in FIG. 2, setting the diameter of the arc of the internal projection 23 larger than the diameter of the arc of the internal projection 26 provides more preferable deforming behaviors. When the diameter of the arc of the internal projection 23 is reduced, the arcuate portion of the internal projection 23 has a difficulty to function as a segmented side of the long side of the quadrangle. When the diameter of the arc of the internal projection 23 is increased, on the other hand, the arcuate portion of the internal projection 23 also easily serves as a side to be buckled alone. Therefore, setting the diameter of the arc of the internal projection 23 greater than the diameter of the arc of the internal projection 26 causes the energy absorbing member to easily buckle since the initial stage of impact to provide excellent impact absorption. Note that this will be described later in connection with Example 2 in which the diameter of the arc of the internal projection 23 and the diameter of the arc of the internal projection 26 are set different from each other.

Figure 4:
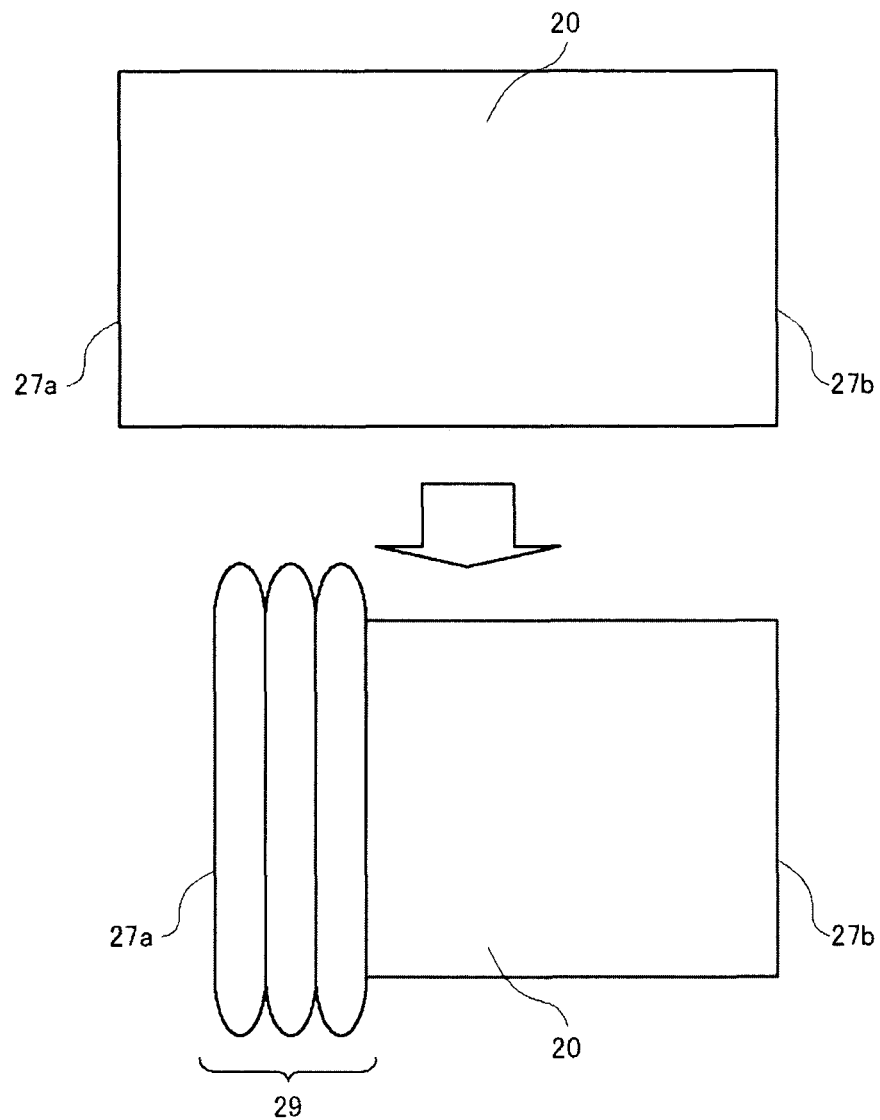
FIG. 4 is an exemplary diagram illustrating the behavior of the energy absorbing member according to an invention example at a time of impact.
Figure 5:
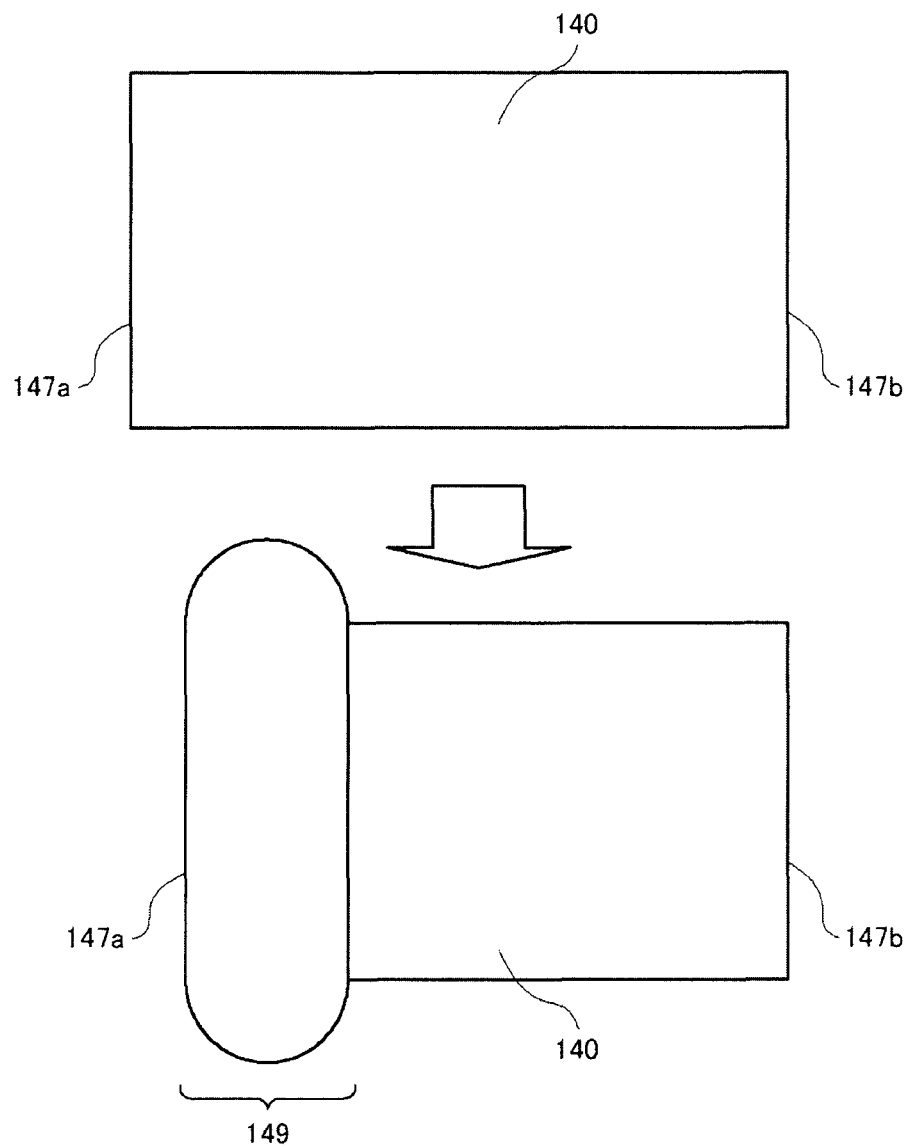
FIG. 5 is an exemplary diagram illustrating the behavior of an energy absorbing member according to a comparative example at a time of impact.
Figure 6:
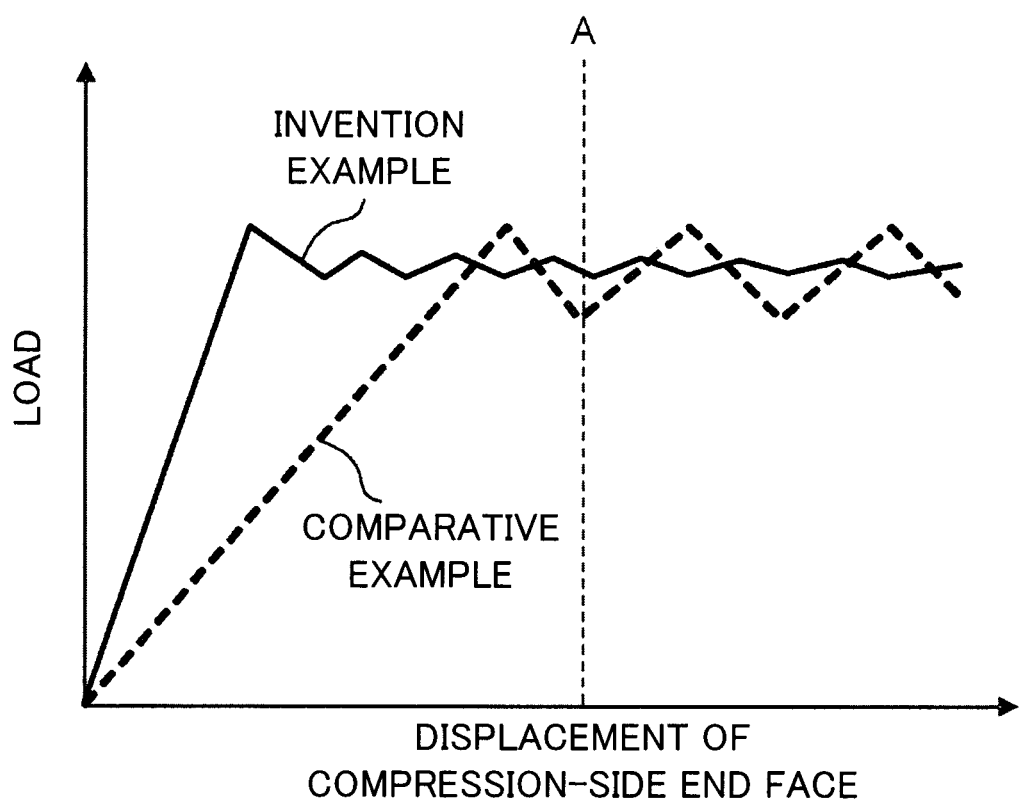
FIG. 6 is a graph exemplarily showing the relation between the displacement of a compression-side end face of the energy absorbing member of each of the invention example and the comparative example.

FIGS. 4 to 6 schematically illustrate the behaviors of the energy absorbing member 20 according to the Embodiment 1 and an energy absorbing member 140 of a comparative example upon deformation in the axial direction.

When a compressive load is applied to the end face 27a of the energy absorbing member 20 in FIG. 4 with the end face 27b fixed, the energy absorbing member 20 finely buckles and deforms at a plurality of locations as deformed portions 29 as illustrated. By way of contrast, as illustrated in FIG. 5, the energy absorbing member 140 of the comparative example, with an end face 147b being fixed in the same manner as the end face 27b, an end face 147a receives a impact-originated compressive load. As a result, the energy absorbing member 140 is likely to be largely buckled and deformed at one location as the deformed portion 149. Although the end faces 27a and 147a on the compression side are buckled and deformed in FIGS. 4 and 5, similar tendency is also seen when the opposite end faces 27b and 147b are buckled and deformed.

As compared with the graph in FIG. 6, in the invention example, a large impact energy is absorbed since the initial stage of impact, and the change (amplitude of) in the load originated from the displacement of the compression-side end face (end face 27a) progresses while repeating comparatively small fluctuation. In the comparative example, by way of contrast, the rise of the load since the initial stage of impact is small, and the amount of impact energy absorbed is small. Also, the change in the load caused by the displacement after the rise progresses with comparatively large fluctuation. From these facts, the example of the present invention, as compared with the comparative example, can absorb larger impact energy at a point A that is assumed to be the point of impact.

In addition, in the Embodiment 1, four corners of the quadrangle has an arcuate shape in cross section projecting inward. This makes it easy to control deformation in buckling deformation so as to be directed inward of the energy absorbing member 20 which is a joined cylindrical body. Further, the length of the straight portion (side wall 21a, 21b, 21c) of the long side of the quadrangle is shortened and high stress is applied to the joint of the straight portion and the arcuate portion (internal projection 23), allowing buckling deformation to occur at an early stage.

Embodiment 2

Figure 7:
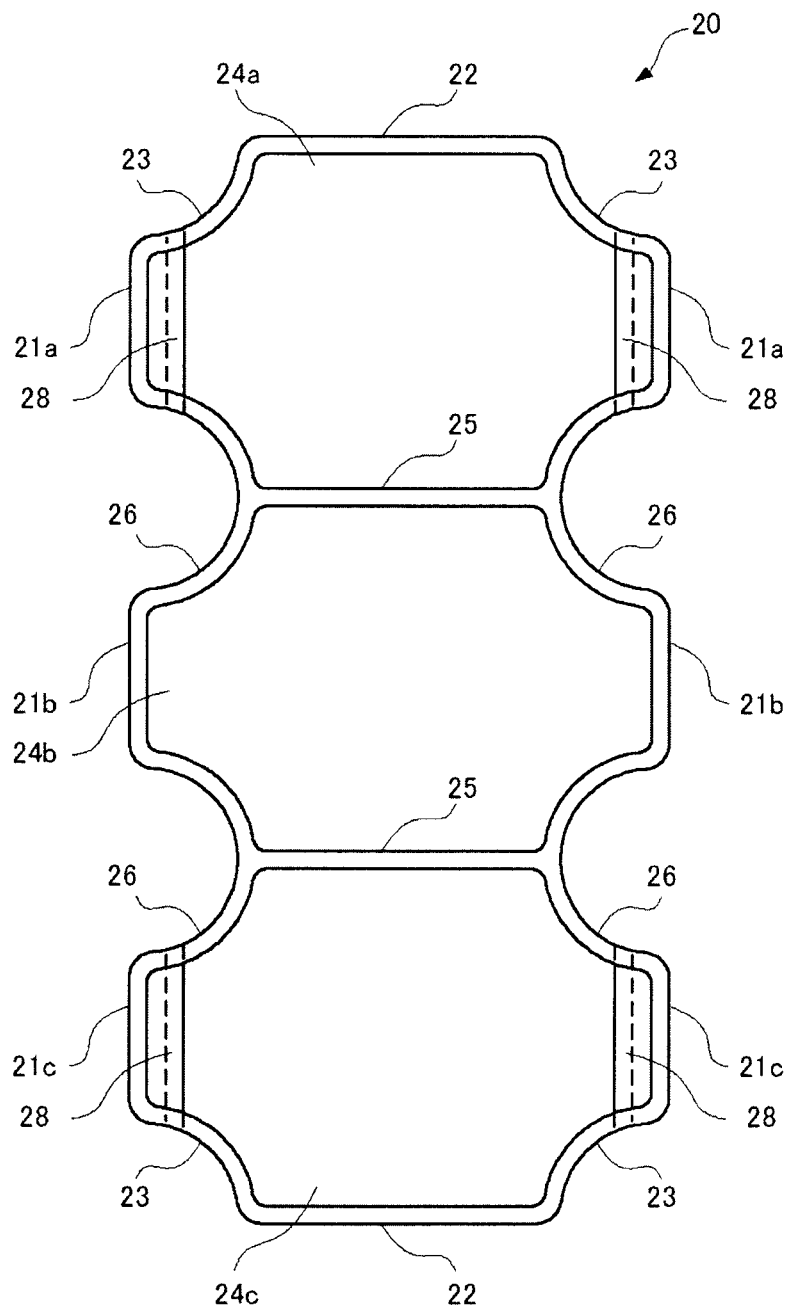
FIG. 7 is a front view of an energy absorbing member according to Embodiment 2.
Figure 8:
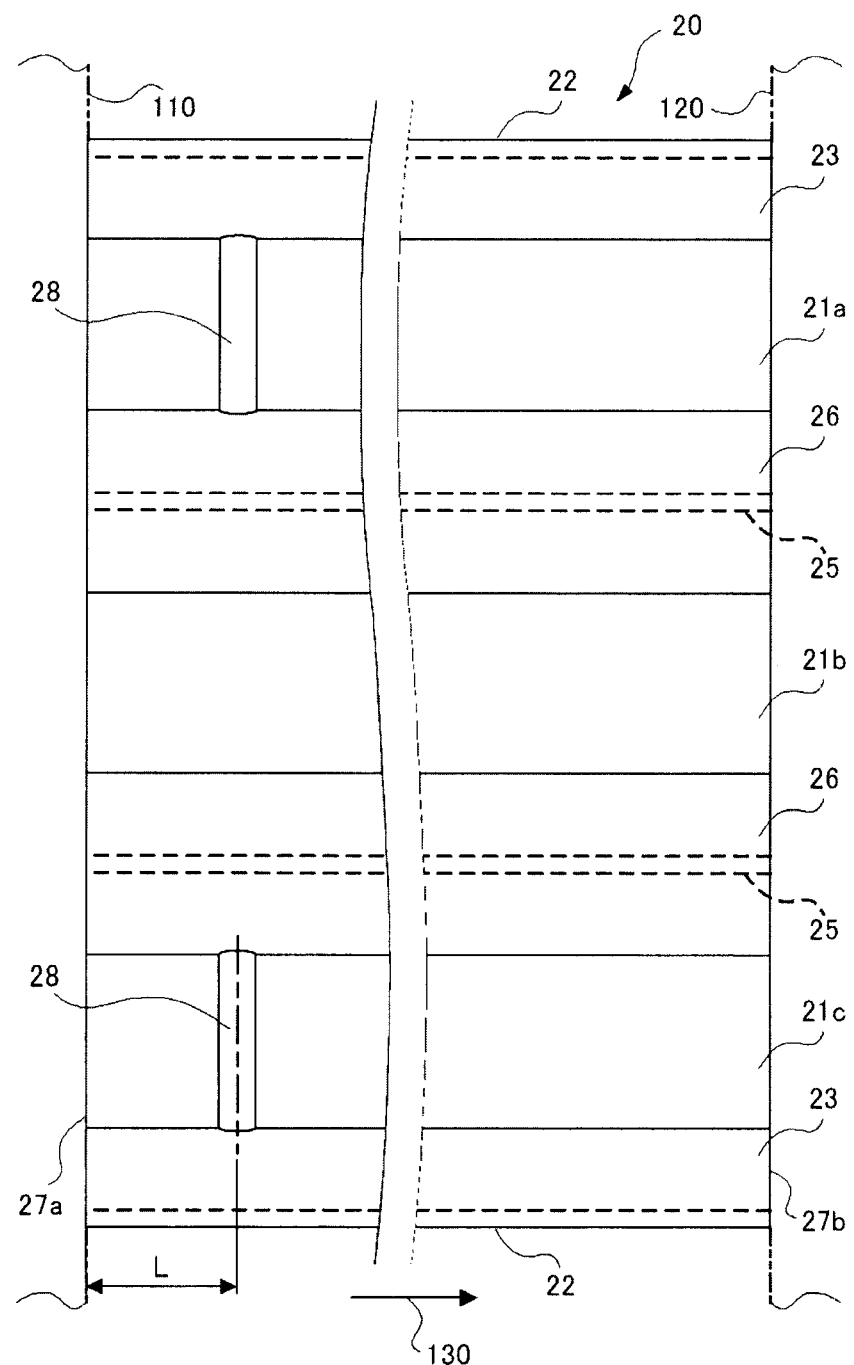
FIG. 8 is a side view of the energy absorbing member according to the Embodiment 2.

FIGS. 7 and 8 illustrate an energy absorbing member 20 according to Embodiment 2. In this embodiment, internal projections 28 are additionally provided to the structure of the Embodiment 1.

The internal projections 28 are provided at a total of four locations, namely, on the side walls 21a and the side walls 21c. The internal projections 28 (grooves as viewed from the outside) are formed by pressing the surfaces of the side walls 21a and the side walls 21c with a die from the right and left outer sides in FIG. 7 at a position of a distance L from the end face 27a. Therefore, only the cross section including the internal projections 28 has a cross-sectional shape different from the cross-sectional shape in the front view shown in FIG. 7.

The distance L is set to a wavelength which is ½ to 1 times the wavelength of initial buckling (in the case of the structure in FIGS. 1 to 3) from the end face 27a which is a compression face. Accordingly, the positions of the internal projections 28 are controlled as the locations of the initial buckling.

Even with the structure of the Embodiment 1, the energy absorbing member is excellent in energy absorption since the initial stage of impact; however, as the internal projections 28 having a smaller cross-sectional area and serving the origins of buckling deformation are provided on the peripheral wall (the side walls 21a and 21c in FIG. 8), the locations of buckling can be controlled. Further, the positions of the internal projections 28 are set to positions of a wavelength which is ½ to 1 times the wavelength of the initial buckling. This makes it possible to cause buckling deformation from the internal projections 28 earlier than is caused in the case where the internal projections 28 are not provided, so that a high load is likely to be applied from an early stage of impact. Further, according to the Embodiment 2, the impact absorbing member is designed to start buckling deformation from a location close to the contact surface (end surface 27a), so that meandering upon application of an oblique compressive load can be suppressed. Furthermore, adjusting the plastic moment at the locations of the internal projections 28 provides a shape that repeatedly buckles and deforms even when an oblique compressive load is applied.

Embodiment 3

Figure 9:
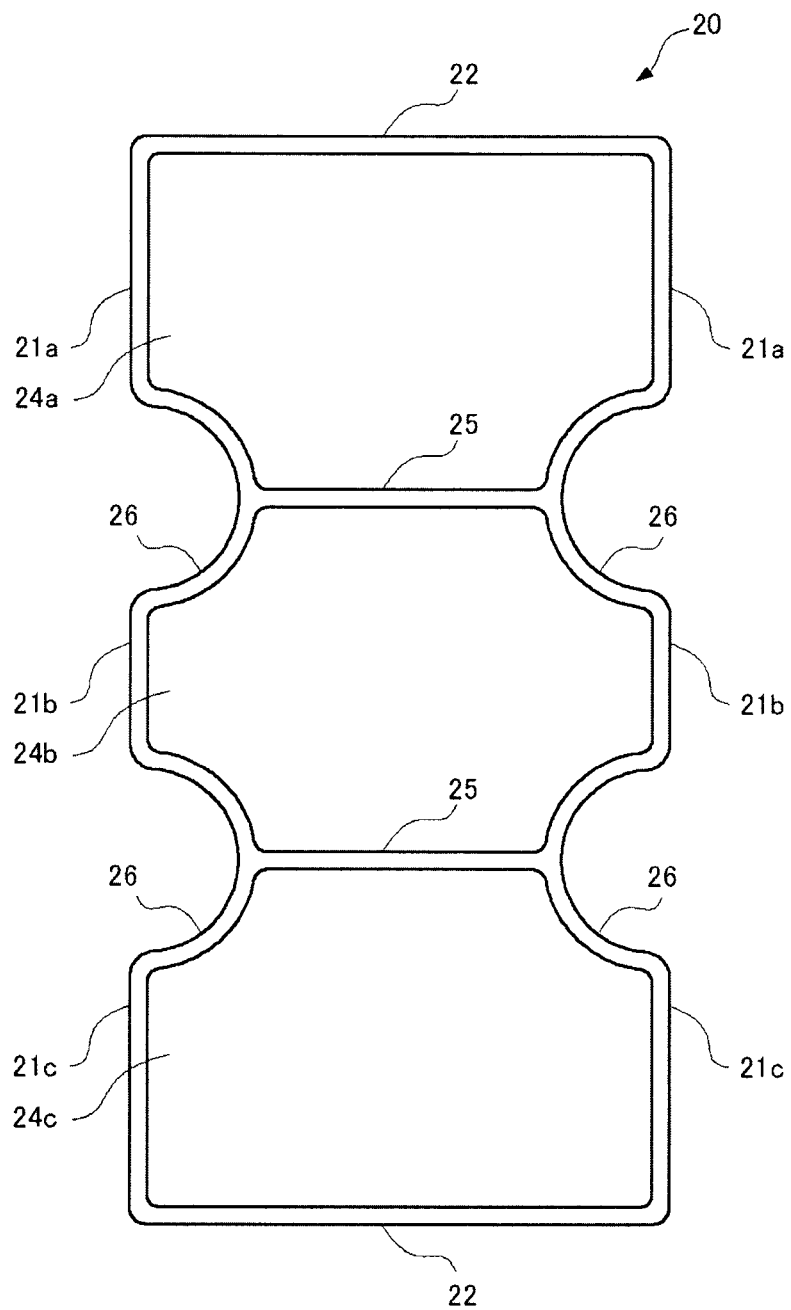
FIG. 9 is a front view of an energy absorbing member according to Embodiment 3.

FIG. 9 illustrates an energy absorbing member 20 according to Embodiment 3. This embodiment differs from the Embodiment 1 in that internal projections 23 at the four corners of the substantially quadrangle in FIG. 2 are not provided.

As will be described later in connection with Examples, provision of the internal projections 26 allows the long sides of the quadrangle into side walls 21a, 21b, and 21c to be segmented. Further, the lengths of the side walls 21a, 21b, and 21c can be changed by changing the radiuses of the semicircular portions of the internal projections 26. Accordingly, the energy absorbing member 20 having a desired impact absorbing performance can be provided even in a mode where the internal projections 23 are not provided.

Although the individual embodiments have been described by way of example in which three cylindrical portions each having a hollow portion in the axial direction are joined, the structure may have two or four cylindrical portions.

Further, in each of the above-described embodiments, in order for the energy absorbing member 20 to take more preferable deformation behaviors, the distance between the side wall 22 which is the straight portion of the short side of the peripheral wall and the rib 25, 25 may be made greater than the distance between a plurality of adjacent ribs 25. When the distance between the straight portion of the short side (side wall 22) and the rib 25 becomes greater, it seems that the stress propagation to the four internal projections 23 is delayed, causing a large deformation at the time of the initial buckling. From this viewpoint, the smaller the distance between the side wall 22 and the rib 25 is, the more excellent buckling deformation becomes.

Embodiment 4

Figure 10:
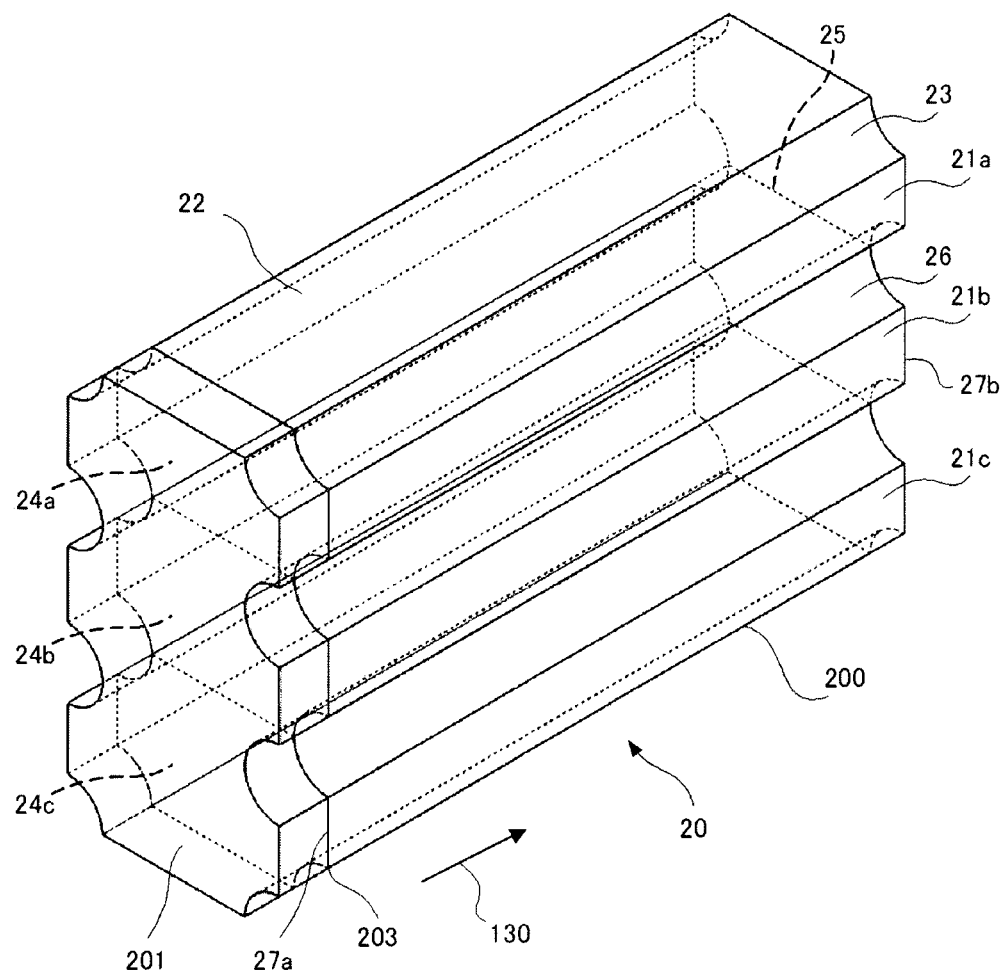
FIG. 10 is a perspective view of an energy absorbing member according to Embodiment 4.

FIG. 10 illustrates an energy absorbing member 20 according to Embodiment 4. As in this embodiment, a lid 201 for sealing the opening surface of one end of a hollow portion 24a, 4b, 24c may be provided to the structure of the Embodiment 1 (hereinafter, referred to as joined cylindrical body 200).

The lid 201 is formed of a material suitable for welding the joined cylindrical body 200 at a welding portion 203. For example, a material for the lid 201 is the same as the material for the joined cylindrical body 200. The lid 201 has a suitable thickness for providing, for example, a screw hole. The shape of the corner or the like of the lid 201 may match, but arbitrarily, with the shape of the internal projections 23, 26.

Although the lid 201 is provided on the side of the end face 27a in the illustrated example, the lid 201 may be provided on the side of the end face 27b.

Since one of the end faces is sealed as in the energy absorbing member 20 of the Embodiment 4, the joined surface of the lid 201 with the reinforcement or the vehicle body frame is formed. This facilitates, for example, bolting, welding or the like, thus improving the workability.

In addition to the above structure, the joined cylindrical body 200 and the lid 201 may be molded integrally. In the case of integral molding, it is not necessary to provide the welding portion 203.

Embodiment 5

Figure 11:
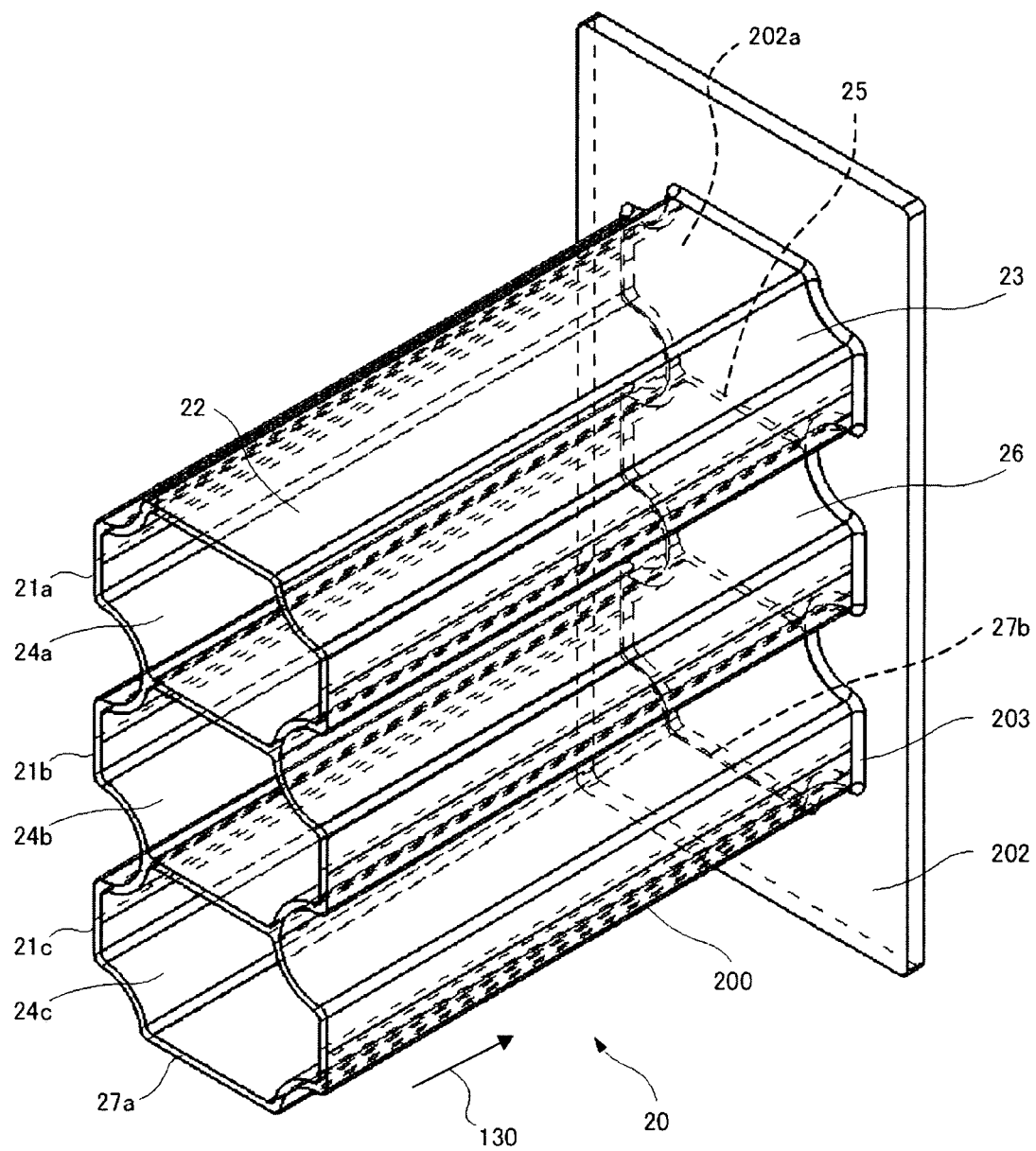
FIG. 11 is a perspective view of an energy absorbing member according to Embodiment 5.

FIG. 11 illustrates an energy absorbing member 20 according to Embodiment 5. As in this embodiment, a flange portion 202 may be formed on one of the ends of the hollow portion 24a, 24b, 24c with respect to the joined cylindrical body 200 which has the structure of the Embodiment 1.

The flange portion 202 is formed of a material suitable for welding to the joined cylindrical body 200 at the welding portion 203. For example, the material for the flange portion 202 is the same as the material for the joined cylindrical body 200. The flange portion 202 has a thickness that may be fixed to other members of the vehicle with mounting holes, for example, provided therein.

The flange portion 202 is provided with one hole 202a having a shape corresponding to the shape of the hollow portions 24a, 24b, 24c of the joined cylindrical body 200 and the ribs 25. The ribs 25 are not welded to the flange portion 202.

Although the flange portion 202 is provided on the side of the end face 27b in the illustrated example, the flange portion 202 may be provided on the side of the end face 27a.

As in the energy absorbing member 20 of the Embodiment 5, the flange portion 202 is formed on either one of the end faces to form a reinforcement or a joint surface with the frame portion of the vehicle body. This facilitates, for example, bolting, welding or the like, thus improving the workability.

In addition to the above-described structure, the joined cylindrical body 200 and the flange portion 202 may be integrally molded. In the case of integral molding, it is not necessary to provide the welding portion 203.

EXAMPLES

Although exemplary examples of the present disclosure will be illustrated to specifically illustrate the present disclosure, the present disclosure is not in any way subject to any restriction by the description of such examples. In addition to the following examples, as well as the above-described specific descriptions, it would be recognizable that various modifications, changes, improvements and the like may be made based on the knowledge of a person skilled in the art without departing from the spirit and scope of the invention.

Example 1

For the model of the invention example and the model of the comparative example departing from the scope of the present disclosure, the deformation form upon compressive deformation in the axial direction was acquired through FEM analysis.

The material model for FEM analysis was made of an A6063 alloy, namely, a 6000-based aluminum alloy extruded material with 0.2% proof stress of 190 MPa. The outer dimensions of the basic cross section of the material model is 140 mm×70 mm, the length in the extrusion direction was set to 200 mm, and the wall thickness was set to 2.0 mm to 2.75 mm, which would vary depending on the model in order to make the initial load peaks uniform.

FEM analysis used general-purpose finite element analysis software RADIOSS (registered trademark). On the premise of welding single plates, the displacement and rotation in directions other than the collapsing direction were restrained, and a rigid body was extruded, and softening of the heat affected zone (HAZ) was ignored.

In the front view of each model to be described below, the combination of the lower 1 digit of the reference numeral of each part and the sub number of a to c corresponds to what is shown in FIG. 2.

Comparative Examples

Figure 12:
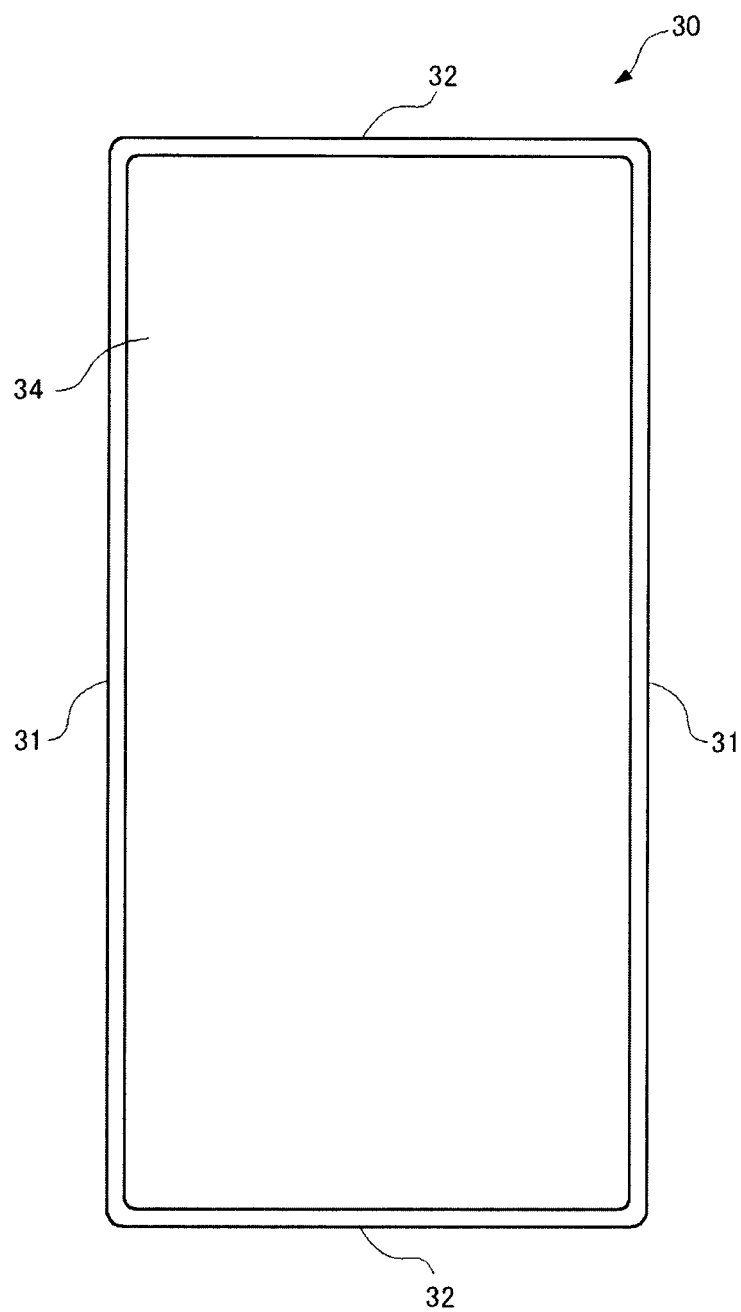
FIG. 12 is a front view of an energy absorbing member according to Comparative Example 1 (having a shape with a single cylindrical portion)
Figure 13:
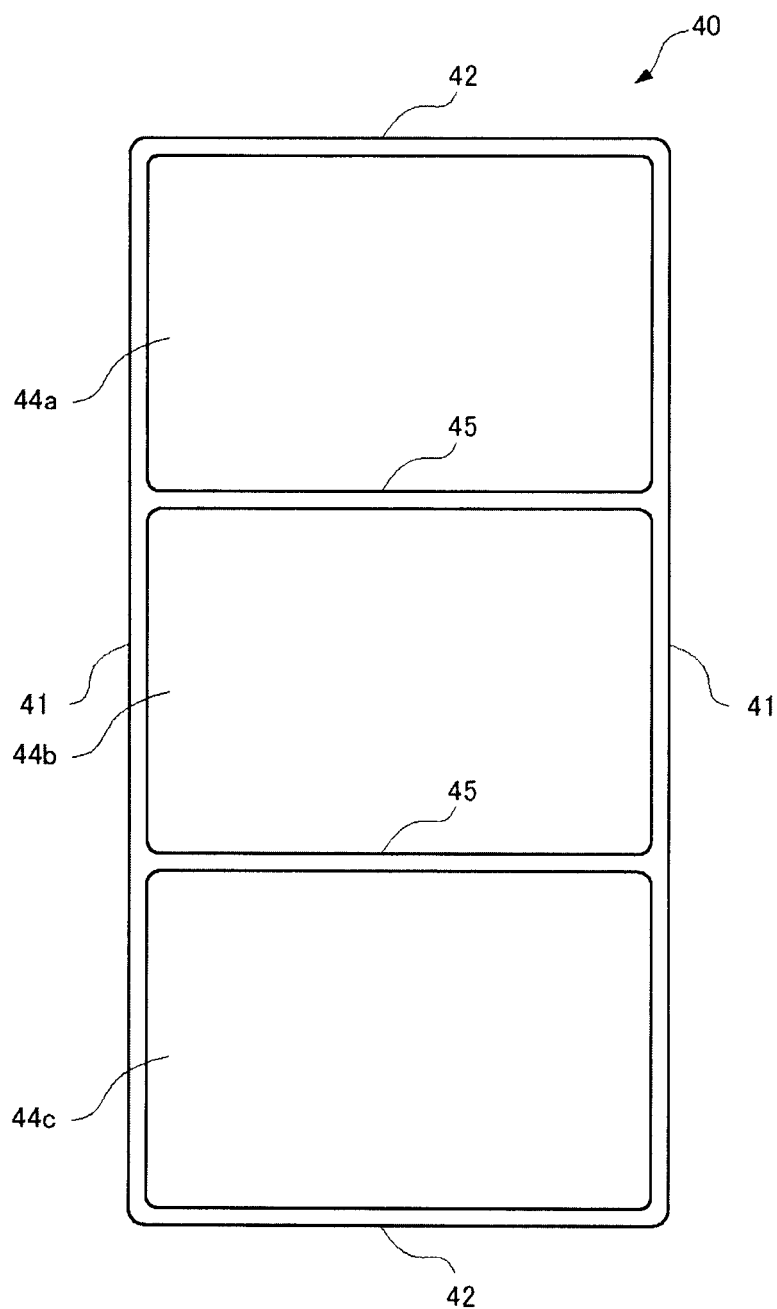
FIG. 13 is a front view of an energy absorbing member according to Comparative Example 2 (having a shape with three joined cylindrical portions)

FIGS. 12 and 13 are front views of models of Comparative Example 1 and Comparative Example 2, respectively. A first shape model based on an energy absorbing member 30 (Comparative Example 1) in FIG. 12 has a cross-sectional shape (the shape of a single quadrangle) of a single cylindrical portion. A second shape model based on an energy absorbing member 40 (Comparative Example 2) in FIG. 13 has a cross-sectional shape in which three cylindrical portions are joined (the shape of three quadrangles). Neither the energy absorbing member 30 nor the energy absorbing member 40 is provided with portions corresponding to the internal projections 23, the ribs 25 and the internal projections 26.

Figure 14:
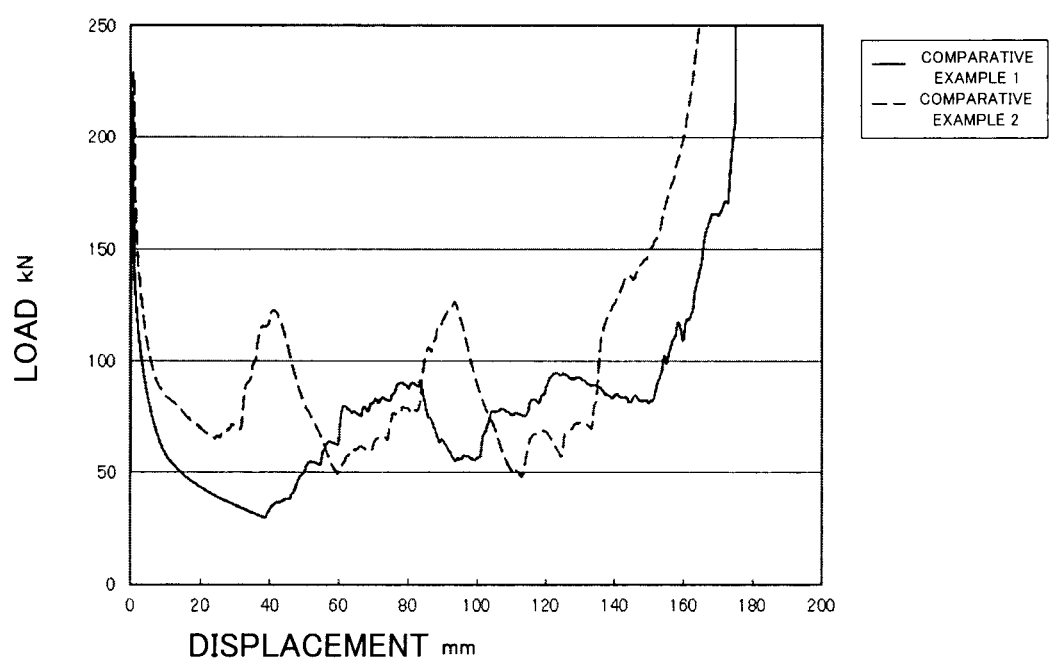
FIG. 14 is a graph showing load v.s. displacement curves obtained through finite element method (FEM) analysis on the energy absorbing members of the Comparative Example 1 and the Comparative Example 2.

FIG. 14 is a graph showing load v.s. displacement curves of the Comparative Example 1 and the Comparative Example 2 originated from compressive deformation. As shown in FIG. 14, the Comparative Example 2 based on the second shape model of FIG. 13 as compared with the Comparative Example 1 based on the first shape model of FIG. 12, demonstrates a quick rise of a secondary peak in the vicinity of a displacement of 100 mm after a load peak in the vicinity of a displacement of 50 mm, resulting in early buckling. However, the Comparative Example 1 and Comparative Example 2 both have large waveform undulations on the load v.s. displacement curve, and do not achieve fine bellows deformation.

Figure 15:
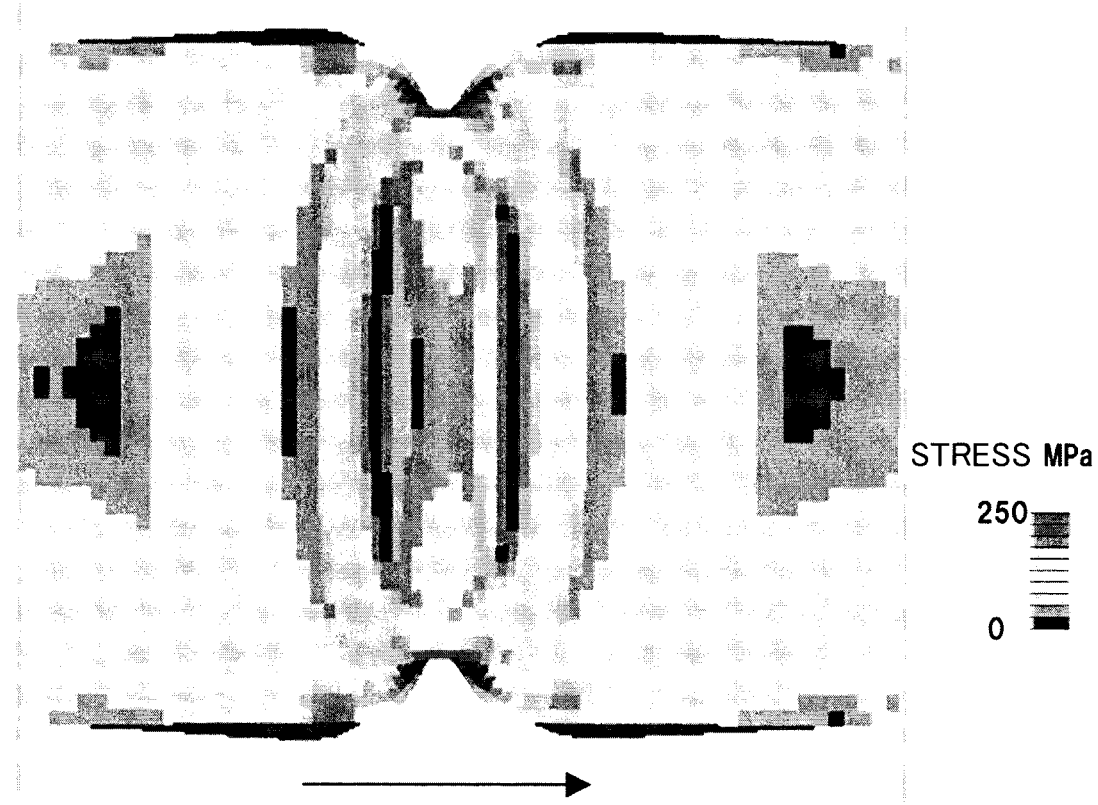
FIG. 15 is an FEM analysis diagram illustrating a compressive deformation form of the energy absorbing member of the Comparative Example 1.
Figure 16:
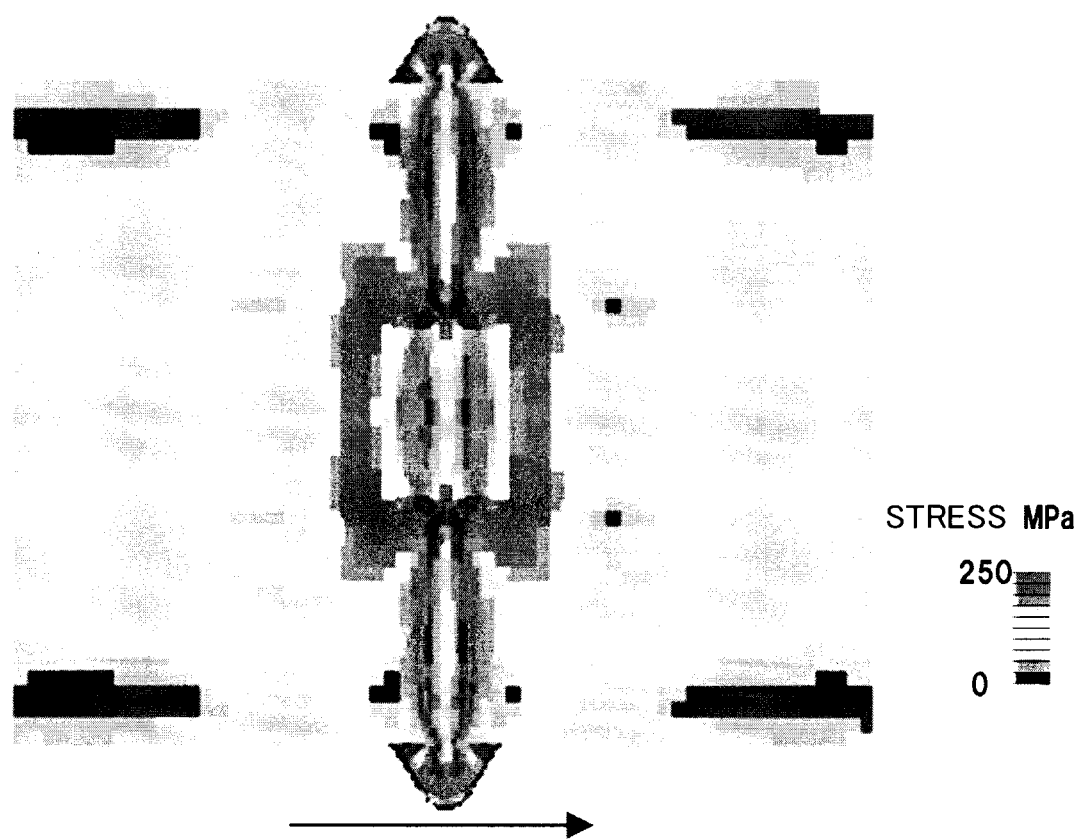
FIG. 16 is an FEM analysis diagram illustrating a compressive deformation form of the energy absorbing member of the Comparative Example 2.

FIGS. 15 and 16 are stress distribution diagrams of the Comparative Example 1 and Comparative Example 2 under compression at 20 mm, respectively. An arrows at the bottom in the stress distribution diagrams, like the compressing direction 130 shown for the individual embodiments, indicate the compressing direction. The right side shown in FIG. 15 and FIG. 16 is the compression-side end face (corresponding to the end face 27a in FIG. 3). (The same applies to the stress distribution diagrams discussed below). In the Comparative Example 1 of FIG. 15, the portion of high stress concentrates in the vicinity of the recess portion in an axial-directional center (horizontal direction in the diagrams). In the Comparative Example 2 of FIG. 16, however, the high stress portions are seen in the vicinity of the projecting portion in an axial-directional center and a portion expressed in an annular shape in the vicinity of a center portion in the analysis diagram. As each of the shape models of the Comparative Example 1 and Comparative Example 2 is limited in terms of the location of high stress, fine buckling deformation is not achieved.

Invention Example 1

Figure 17:
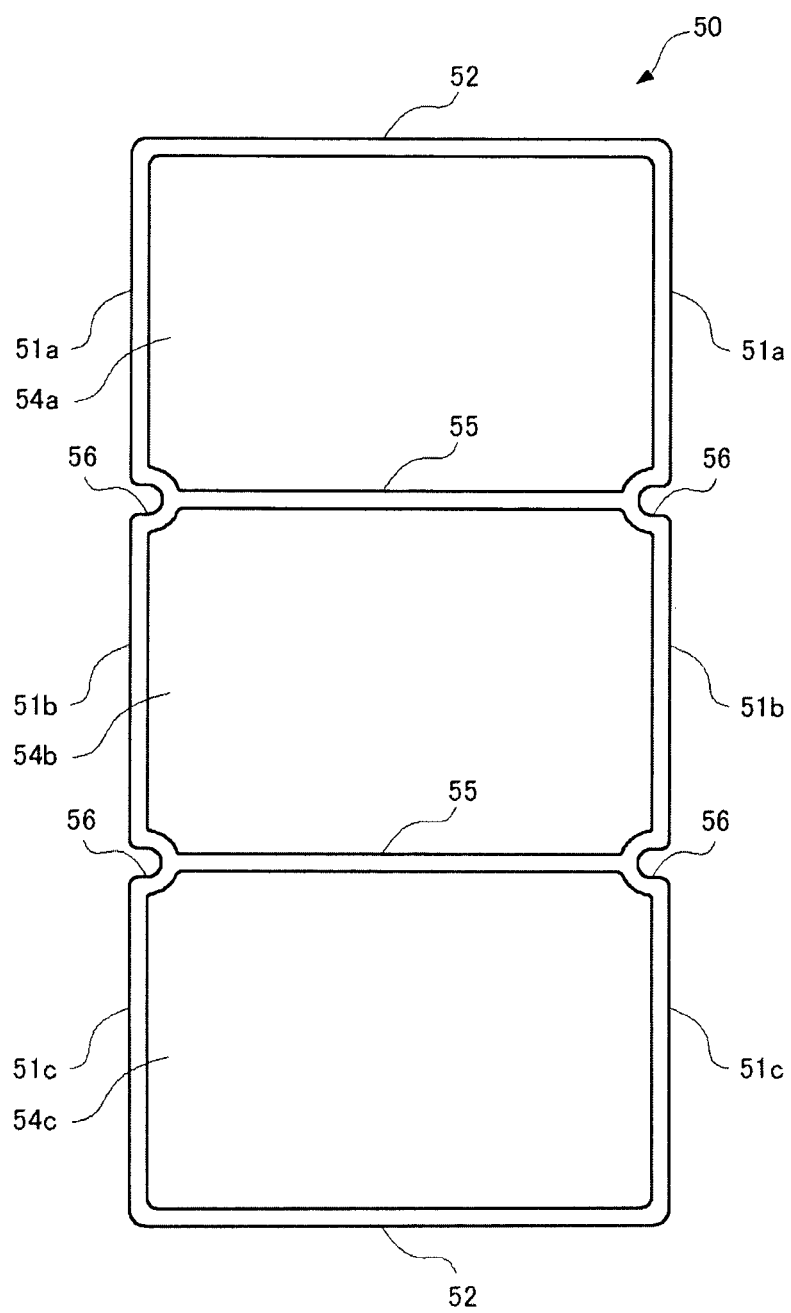
FIG. 17 is a front view of an energy absorbing member according to Invention Example 1.

FIG. 17 is a front view of a model according to Invention Example 1. An energy absorbing member 50 in FIG. 17 corresponds to the above-described Embodiment 3 (FIG. 9). The energy absorbing member 50 is the energy absorbing member 40 in FIG. 13 to which four internal projections 56 corresponding to the internal projections 26 in FIG. 2 are added. It is to be noted however that the radius of the semicircular portion of the internal projection 56 is smaller than the radius of the internal projection 26 in FIG. 9. Portions corresponding to the internal projections 23 in FIG. 2 are not provided on the energy absorbing member 50.

Figure 18:
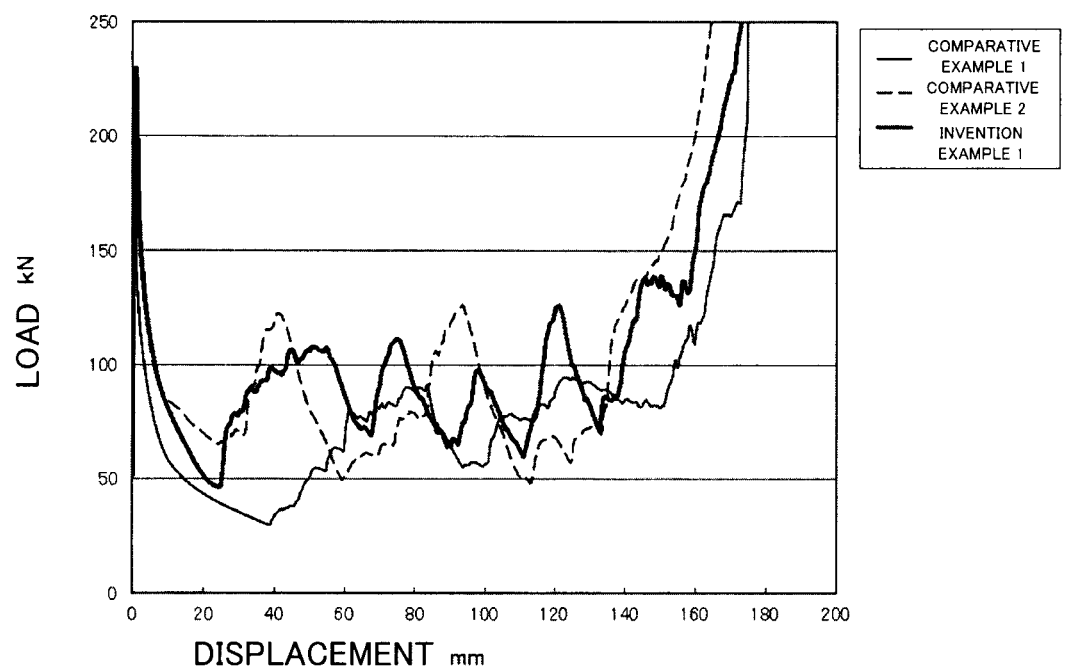
FIG. 18 is a graph showing load v.s. displacement curves obtained through FEM analysis on the energy absorbing member of the Invention Example 1.

FIG. 18 is a graph in which a load v.s. displacement curve of the model of the energy absorbing member 50 originated from compressive deformation is placed over the two load v.s. displacement curves in FIG. 14. As shown in FIG. 18, the Invention Example 1, as compared with the Comparative Example 1 and Comparative Example 2, demonstrates a quick rise of a secondary peak in the vicinity of a displacement of 80 mm after a load peak in the vicinity of a displacement of 50 mm, and fine waveform undulations. This indicates that the energy absorbing member 50 is an impact absorbing member that achieves early buckling and fine bellows deformation.

Figure 19:
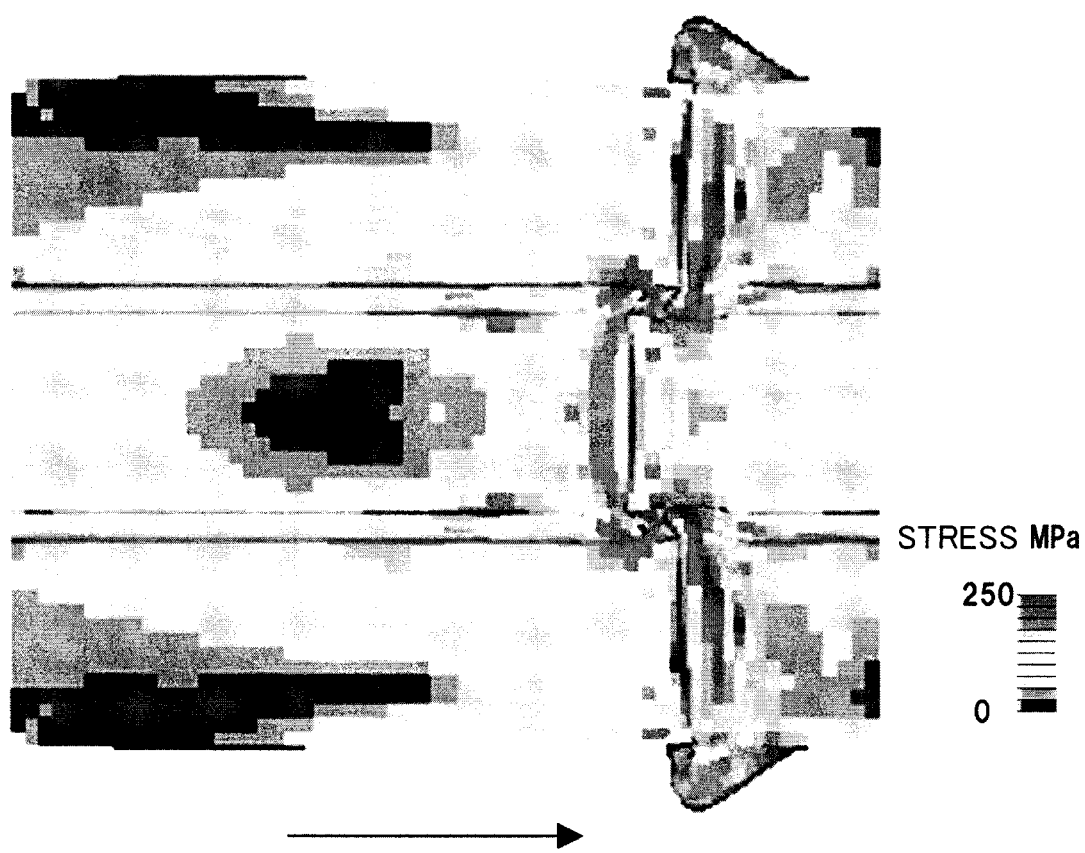
FIG. 19 is an FEM analysis diagram illustrating a compressive deformation form of the energy absorbing member of the Invention Example 1.

FIG. 19 is a stress distribution diagram of the model of the energy absorbing member 50 under compression at 20 mm. As shown in FIG. 19, stress becomes high at the four corners of the substantially quadrangle and in the vicinity of base portions of ribs 55 and the internal projections 56 since the initial stage of compression, thereby ensuring fine and stable bellows deformation.

Invention Example 2

Figure 20:
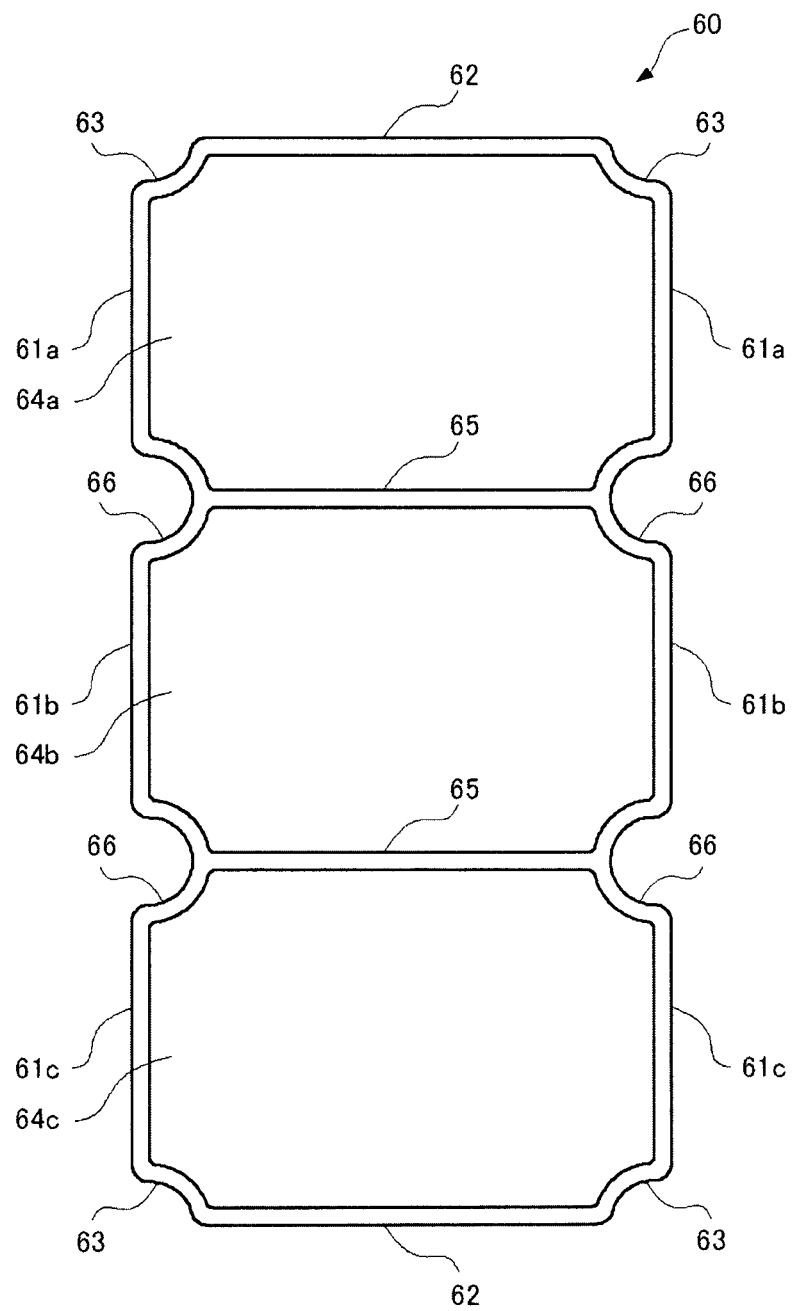
FIG. 20 is a front view of an energy absorbing member according to Invention Example 2.

FIG. 20 is a front view of a model according to Invention Example 2. An energy absorbing member 60 in FIG. 20 is the energy absorbing member 50 in FIG. 17 to which four internal projections 63 corresponding to the internal projections 26 in FIG. 2 are added. In addition, the radius of the semicircular portion of the internal projection 66 of the energy absorbing member 60 is set larger than the radius of the internal projection 56 of the energy absorbing member 50. That is, the side lengths of side walls 61a, 61b and 61c of the energy absorbing member 60 are set shorter than the side lengths of side walls 51a, 51b and 51c of the energy absorbing member 50.

Figure 21:
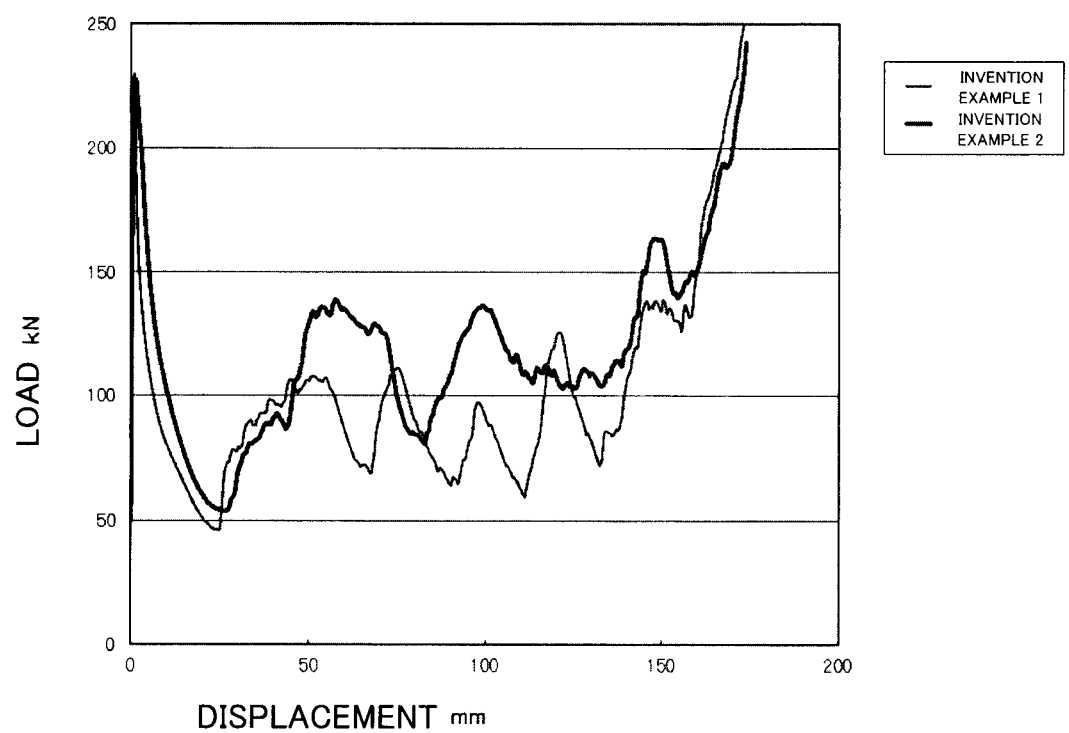
FIG. 21 is a graph showing a load v.s. displacement curves obtained through FEM analysis on the energy absorbing member of the Invention Example 2.

FIG. 21 is a graph in which a load v.s. displacement curve of the model of the energy absorbing member 60 originated from compressive deformation is placed over the load v.s. displacement curve of the model of the energy absorbing member 50 in FIG. 18. The comparison of the waveform of the model of the energy absorbing member 60 with the waveform of the model of the energy absorbing member 50 shows that the rise of a secondary peak (in the vicinity of a displacement of 70 mm) after a load peak (in the vicinity of a displacement of 50 mm) of the model of the energy absorbing member 60 is equivalent to that of the model of the energy absorbing member 50, and shows a higher average load thereafter, which indicates an excellent impact absorbing performance.

Figure 22:
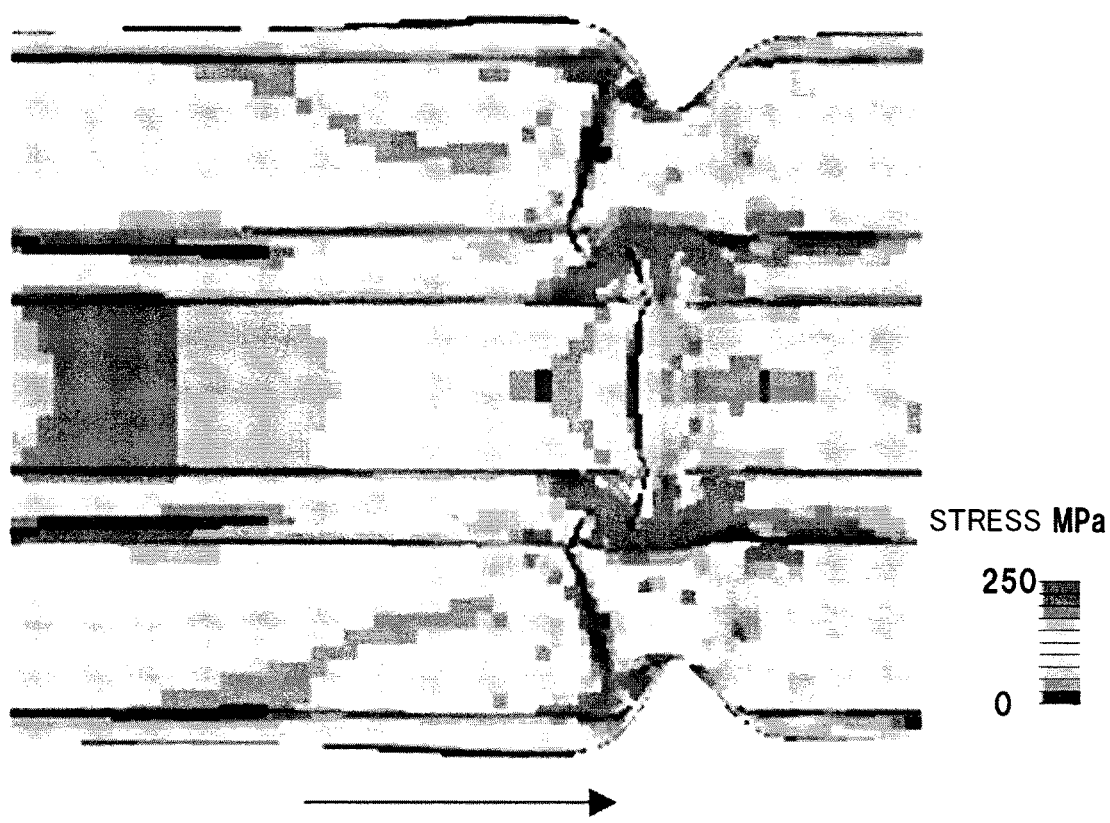
FIG. 22 is an FEM analysis diagram illustrating a compressive deformation form of the energy absorbing member of the Invention Example 2.

FIG. 22 is a stress distribution diagram of the model of the energy absorbing member 60 under compression at 20 mm. The side lengths of side walls 61a, 61b and 61c of the energy absorbing member 60 are set shorter than the side lengths of side walls 51a, 51b and 51c of the energy absorbing member 50, thus accelerating stress propagation to the entire surface upon compression. As a result, stress becomes high at the individual corners (in the vicinity of the internal projections 63) and in the vicinity of the internal projections 66, achieving fine buckling deformation as shown in FIG. 22.

Invention Example 3

Figure 23:
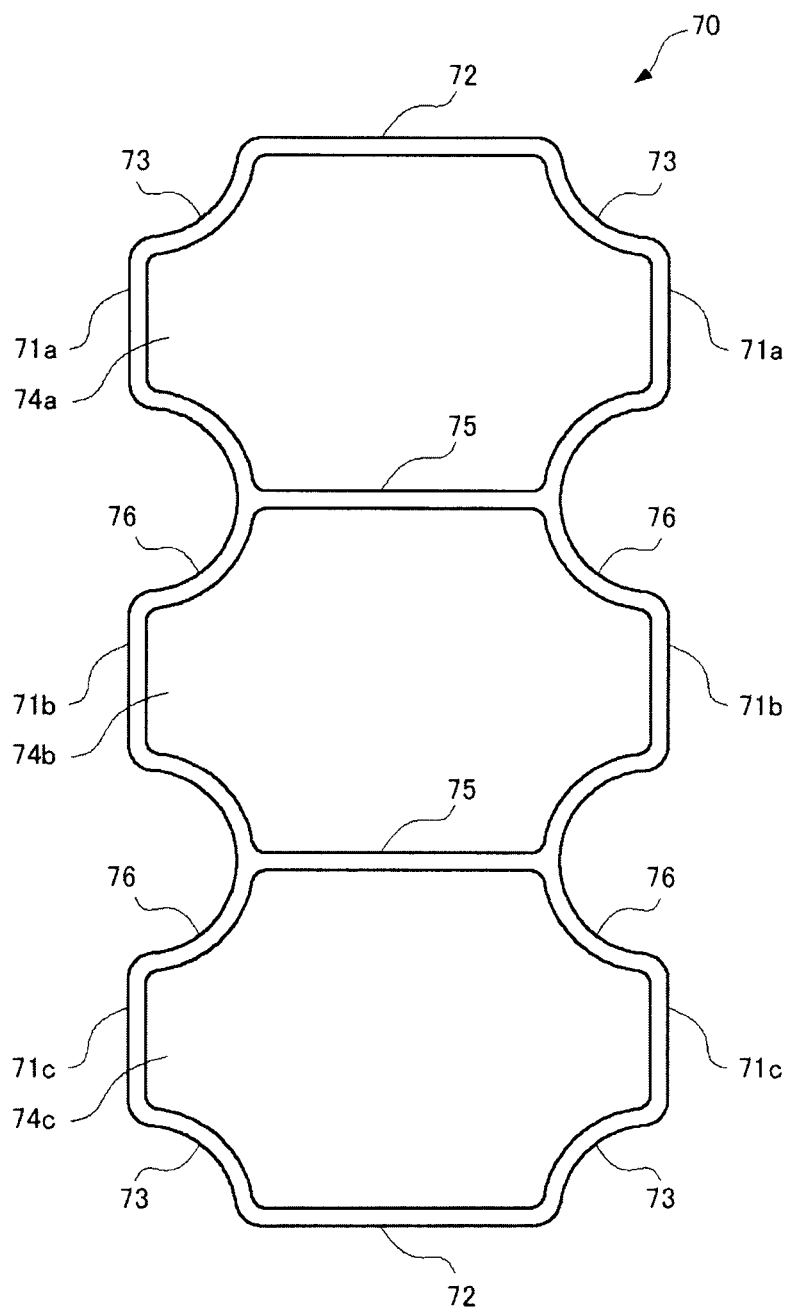
FIG. 23 is a front view of an energy absorbing member according to Invention Example 3.

FIG. 23 is a front view of a model according to Invention Example 3. An energy absorbing member 70 in FIG. 23 has arcuate internal projections 76 disposed at base portions of ribs 75 and side walls 71a, 71b, and 71c, and arcuate internal projections 73 are disposed at the four corner of a substantially quadrangle. The radiuses of internal projections 73 and internal projections 76 of the energy absorbing member 70 are set larger than the radiuses of the internal projections 63 and the internal projections 66 of the energy absorbing member 60 in FIG. 20. That is, the side lengths of the side walls 71a, 71b and 71c of the energy absorbing member 70 are set shorter than the side lengths of the side walls 61a, 61b and 61c of the energy absorbing member 60.

Figure 24:
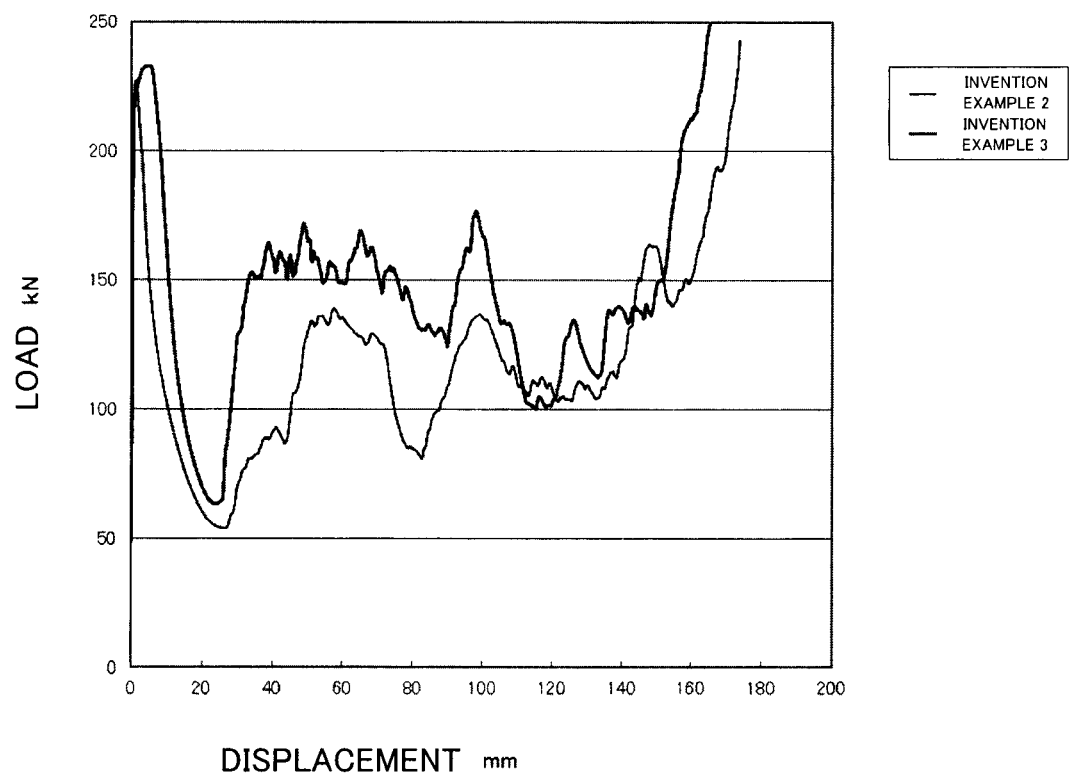
FIG. 24 is a graph showing a load v.s. displacement curves obtained through FEM analysis on the energy absorbing member of the Invention Example 3.

FIG. 24 is a graph in which a load v.s. displacement curves of the model of the energy absorbing member 70 originated from compressive deformation is placed over the load v.s. displacement curve of the model of the energy absorbing member 60 in FIG. 21. The comparison of the waveform of the model of the energy absorbing member 70 with the waveform of the model of the energy absorbing member 60 shows an earlier secondary peak (in the vicinity of a displacement of 50 mm), and shows a waveform with fewer undulations and a higher average load.

Figure 25:
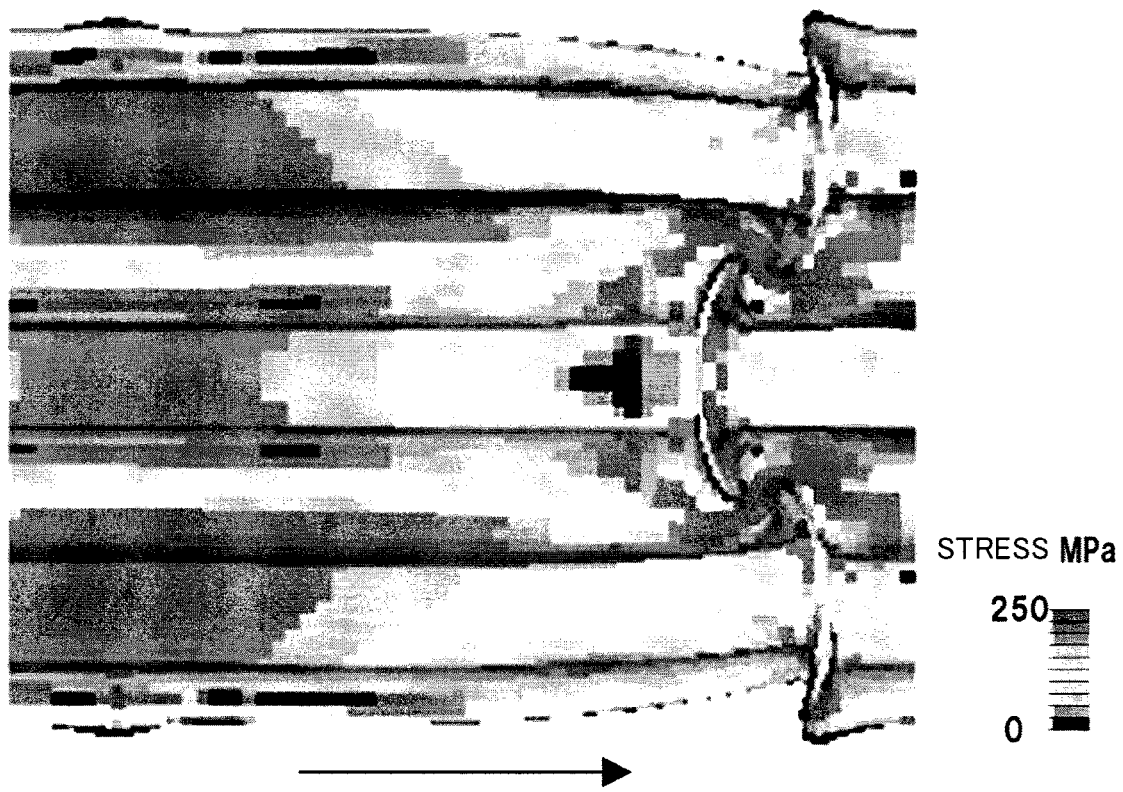
FIG. 25 is an FEM analysis diagram illustrating a compressive deformation form of the energy absorbing member of the Invention Example 3.

FIG. 25 is a stress distribution diagram of the model of the energy absorbing member 70 under compression at 20 mm. In the model of the energy absorbing member 70, as the side lengths of the separated side walls 71a, 71b and 71c are shortened, the stress propagation to the entire surface upon compression is accelerated, providing more excellent impact absorbing performance.

Invention Example 4

Figure 26:
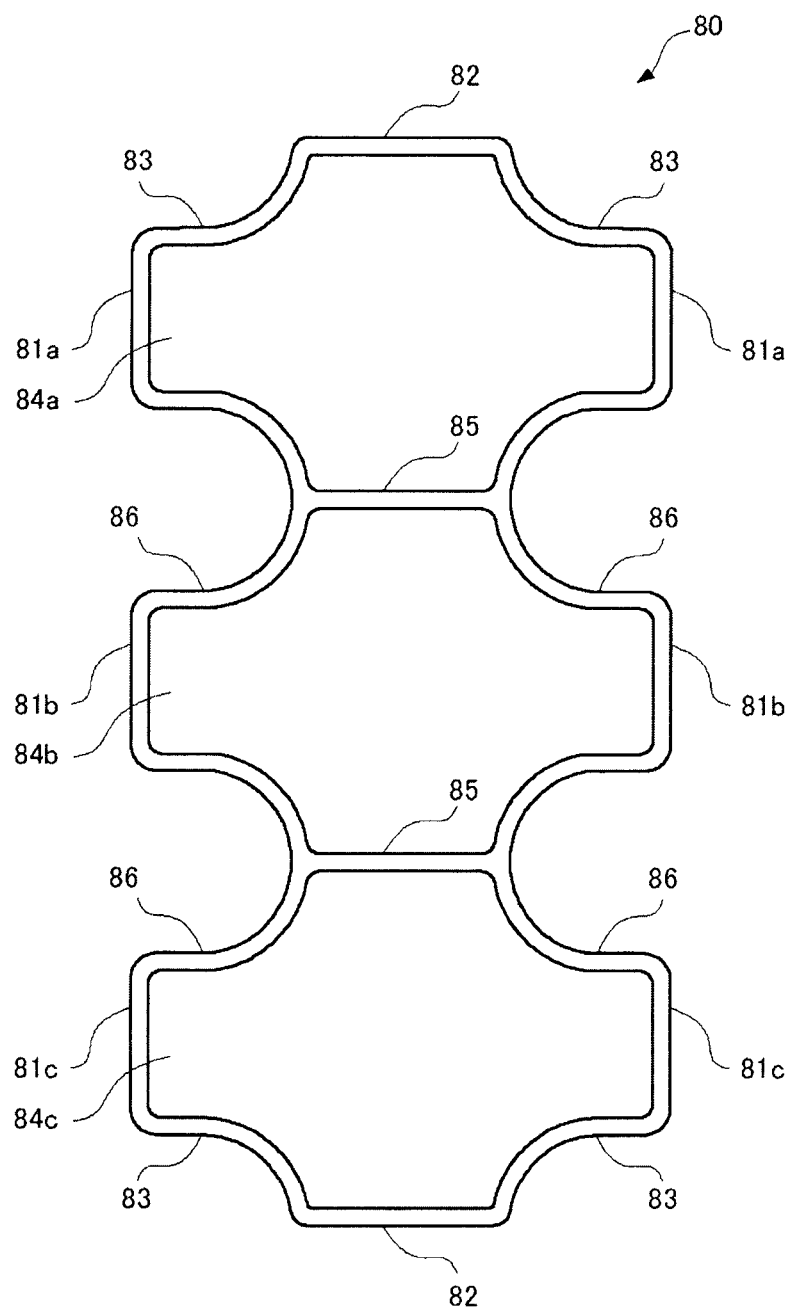
FIG. 26 is a front view of an energy absorbing member according to Invention Example 4.

FIG. 26 is a front view of a model according to Invention Example 4. An energy absorbing member 80 in FIG. 26 has internal projections 83 and internal projections 86 whose arcs are located more inward (closer to the center in the horizontal direction in the figure) of the closed cross sections of three cylindrical portions as compared with the energy absorbing member 70 in FIG. 23. That is, the side lengths of side walls 81a, 81b and 81c of the energy absorbing member 80 are equal to the side lengths of side walls 71a, 71b and 71c of the energy absorbing member 70, whereas the side lengths of side walls 82 and ribs 85 are shorter than the side lengths of the side walls 72 and the ribs 75.

Figure 27:
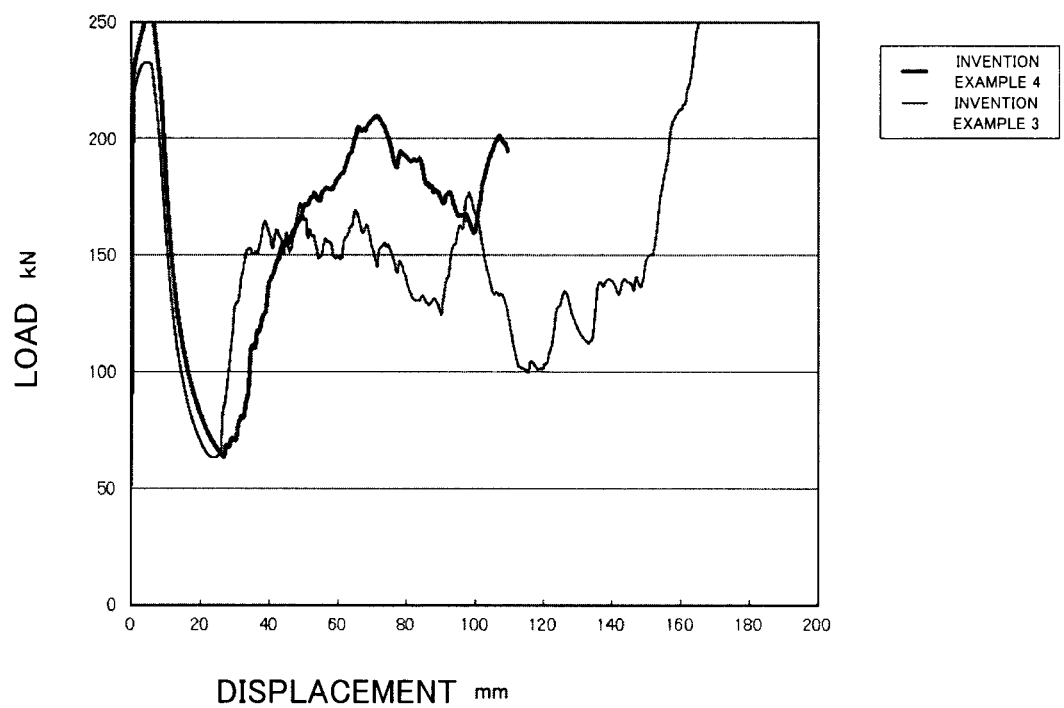
FIG. 27 is a graph showing a load v.s. displacement curves obtained through FEM analysis on the energy absorbing member of the Invention Example 4.

FIG. 27 is a graph in which a load v.s. displacement curve of the model of the energy absorbing member 80 originated from compressive deformation is placed over the load v.s. displacement curve of the model of the energy absorbing member 70 in FIG. 24. The comparison of the waveform of the model of the energy absorbing member 80 with the waveform of the model of the energy absorbing member 70 shows that the rise of a secondary peak (in the vicinity of a displacement of 110 mm) is delayed, and undulations of the waveform become larger.

Figure 28:
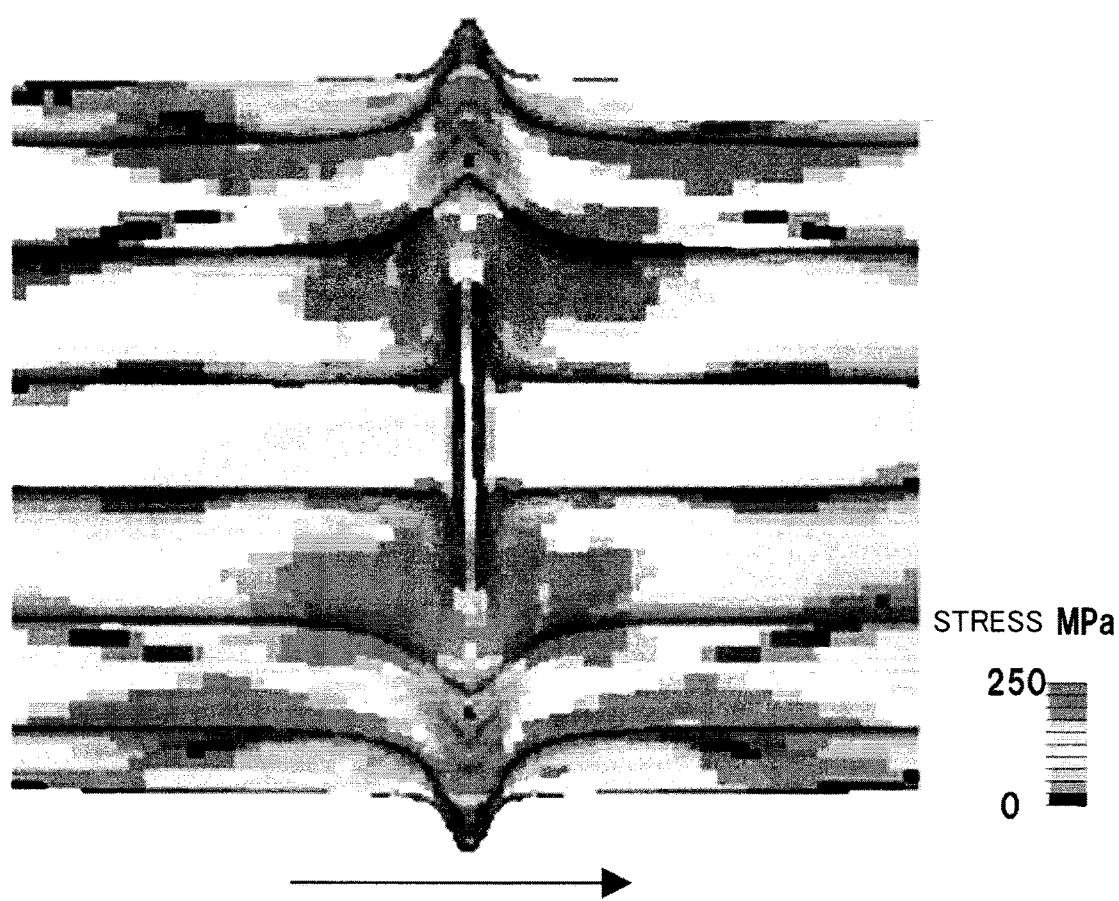
FIG. 28 is an FEM analysis diagram illustrating a compressive deformation form of the energy absorbing member of the Invention Example 4.

FIG. 28 is a stress distribution diagram of the model of the energy absorbing member 80 under compression at 20 mm. Unlike in the stress distribution diagram of FIG. 25, the position of high stress is at a center portion in the axial direction, and is seen along the axial direction in the vicinity of the internal projections 83 adjacent to the side walls 81a and 81c as well as in the vicinity of the internal projections 86.

The results of analysis on the model of the energy absorbing member 80 shows that the waveform can be controlled by the side lengths of the separated side walls 81a, 81b, 81c and the depths of the arcs of the internal projections 83 and the internal projections 86.

The cross-sectional model of the Invention Example 3 (FIG. 23) among the Invention Examples 1 to 4 has the best impact absorbing performance. Disposing portions which project inward, such as the internal projections 28, on the side surfaces permits the locations of initial buckling to be controlled, so that the energy absorbing member will not be bent even upon an oblique compression, and achieves stable bellows deformation.

Embodiment 2

Figure 29:
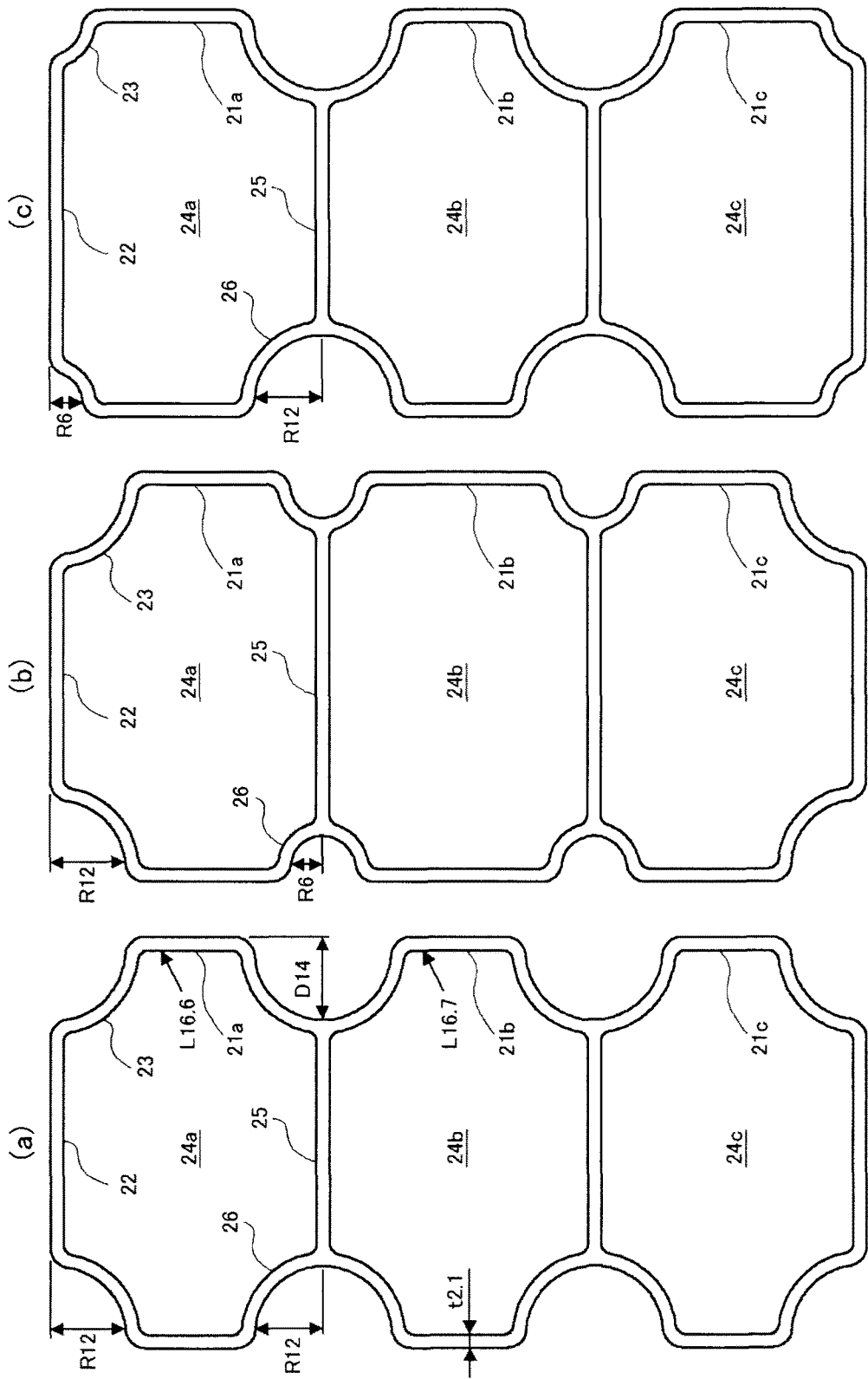
FIG. 29 is a front view of energy absorbing members according to a model (a), a model (b) and a model (c) of Example 2.

For this embodiment with the structure of the Embodiment 1, the diameter of the arc of the internal projection 23, was compared with the diameter of the arc of the internal projection 26. The scheme of FEM analysis on models (a) to (c) illustrated in FIG. 29 are the same as that of the Embodiment 1.

As in FIG. 2, the radius of the arc of the internal projection 23 is 12 mm which is the same as the radius of the arc of the internal projection 26. The depths of the arcuate portions from the side walls 21a, 21b, 21c were set to 14 mm. The length of the straight portion of the side wall 21a is 16.6 mm which is the same as the length of the straight portion of the side wall 21c. The length of the straight portion of the side wall 21b is 16.7 mm which is substantially equal to the lengths of the straight portions of the side walls 21a and 21c. Further, the thicknesses of the individual portions illustrated were set to 2.1 mm.

For the model (b), the radius of the arc of the internal projection 26 was set to 6 mm smaller than that of the model (a). Accordingly, the radius of the arc of the internal projection 23 located at a position diagonal to the internal projection 26 in the cylindrical portion including the hollow portion 24a is larger than the radius of the arc of the internal projection 26.

For the model (c), the radius of the arc of the internal projection 23 was set to 6 mm, smaller than that of the model (a). Accordingly, the radius of the arc of the internal projection 23 located at a position diagonal to the internal projection 26 in the cylindrical portion including the hollow portion 24a is smaller than the radius of the arc of the internal projection 26.

Figure 30:
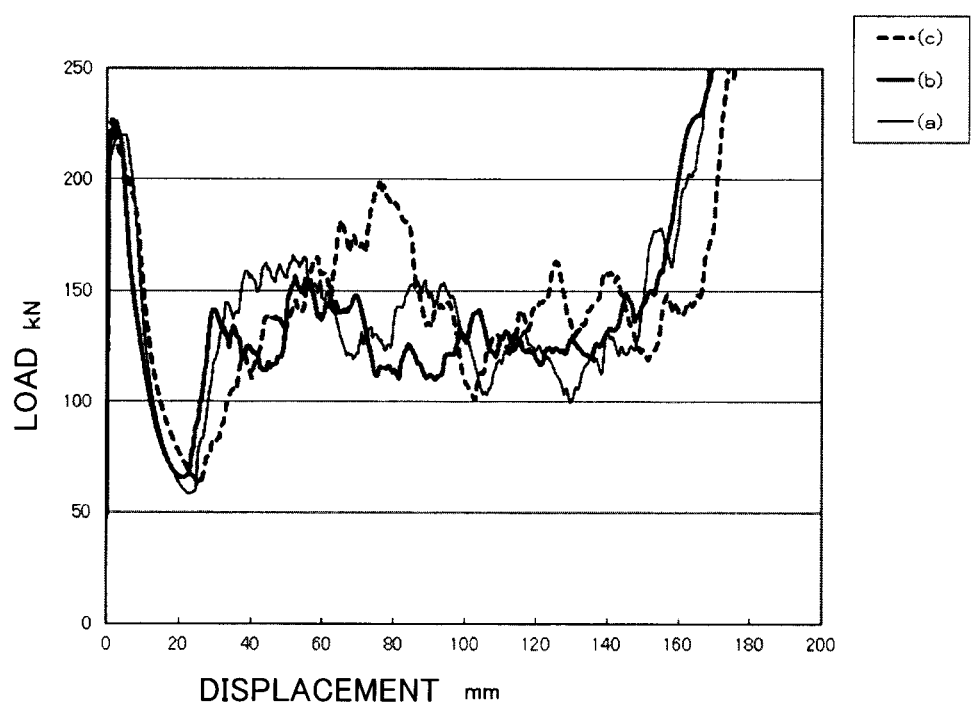
FIG. 30 is a graph showing a load v.s. displacement curves obtained through FEM analysis on the energy absorbing members of the model (a), model (b) and model (c)

FIG. 30 is a graph in which load v.s. displacement curves of the model (a), the model (b) and the model (c) (denoted only by (a), (b) and (c) in the figure) originated from compressive deformation are placed over one another. It is shown that the waveform of the model (b) where the radius of the arcs of the internal projections 23 at the four corners of the substantially quadrangle is larger than the radius of the arcs of the internal projections 26 positioned at the center portion has a comparatively early rise of a secondary peak (in the vicinity of a displacement of 50 mm), and shows a stable load transition with fewer undulations as compared with the waveform of the model (a). By way of contrast, the waveform of the model (c) where the radius of the arcs of the internal projections 23 is smaller than the radius of the arcs of the internal projections 26 causes significant deformation toward the vicinity of a displacement of 80 mm, and has large undulations.

Figure 31:
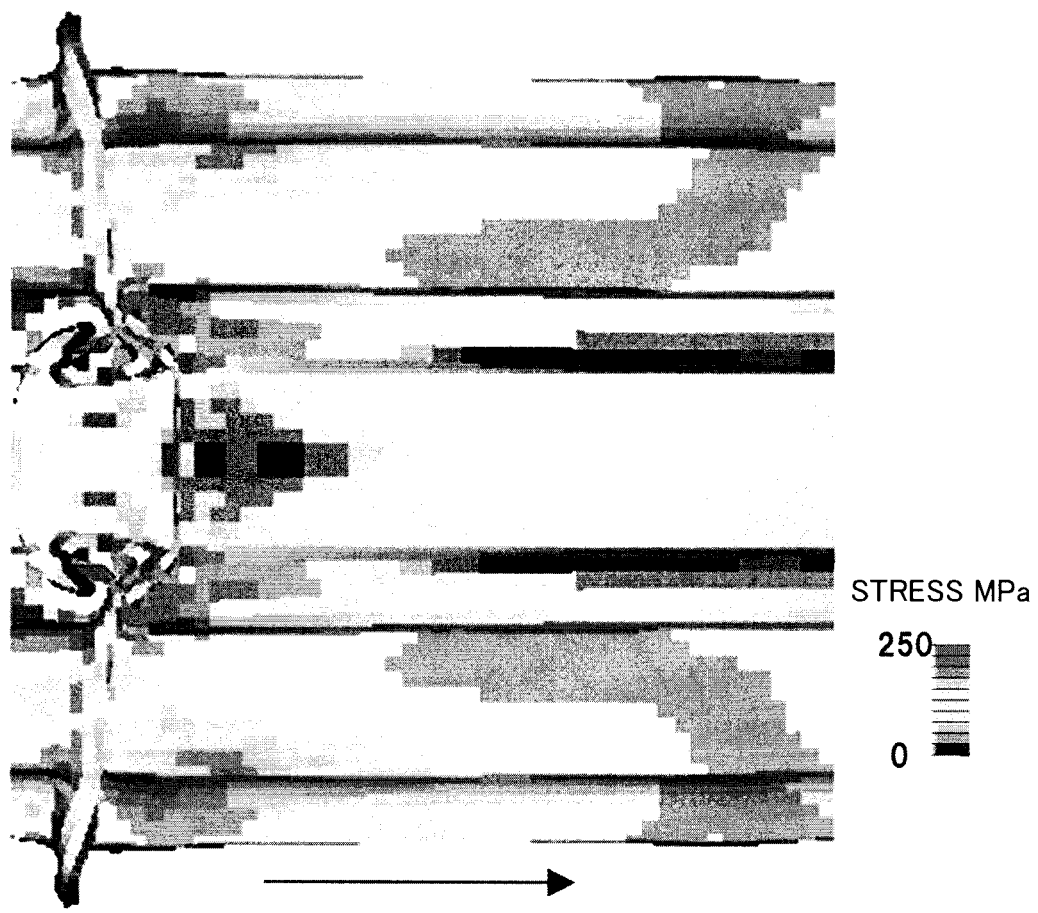
FIG. 31 is an FEM analysis diagram illustrating a compressive deformation form of the energy absorbing member of the model (b)
Figure 32:
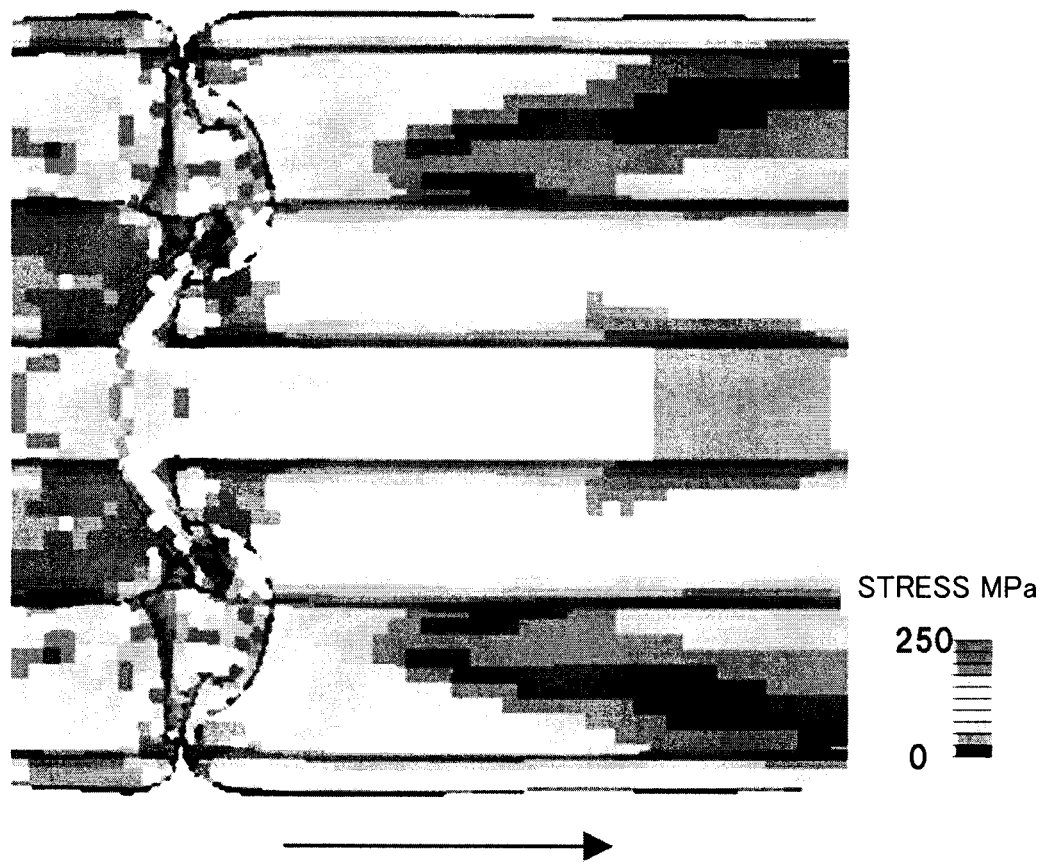
FIG. 32 is an FEM analysis diagram illustrating a compressive deformation form of the energy absorbing member of the model (c).

FIGS. 31 and 32 are stress distribution diagrams of the model (b) and the model (c) under compression at 50 mm. The model (b) of FIG. 31 shows large deformation in the vicinity of the internal projections 23 at the corners of the substantially quadrangle, whereas the model (c) of FIG. 32 shows large deformation in the vicinity of the internal projections 26 closer to the center of the long sides of the substantially quadrangle. Further, the distance from the compression-side end face of the model (b) is closer than that from the model (c).

It may be said from the above results that the model (b) where the radius of the arcs of the internal projections 23 at the four corners of the substantially quadrangle is larger than the radius of the arcs of the internal projections 26 located at the center portion shows favorable deformation behaviors upon compression than the model (c) where the radius of the arcs of the internal projections 23 smaller larger than the radius of the arcs of the internal projections 26.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2015-252084, filed on Dec. 24, 2015, the entire disclosure of which is incorporated by reference herein.

INDUSTRIAL APPLICABILITY

The energy absorbing member according to the present disclosure is suitably used as a constituting member of a bumper structure for a vehicle, such as an automobile.

REFERENCE SIGNS LIST 20, 30, 40, 50, 60, 70, 80, 140 Energy absorbing member
21a, 21b, 21c, 51a, 51b, 51c, 61a, 61b, 61c,
71a, 71b, 71c, 81a, 81b, 81c Side wall
22, 32, 42, 52, 62, 72, 82 Side wall
23, 63, 73, 83 Internal projection
24a, 24b, 24c, 34, 44a, 44b, 44c, 54a, 54b, 54c,
64a, 64b, 64c, 74a, 74, 74c, 84a, 84b, 84c Hollow portion
25, 45, 55, 65, 75, 85 Rib
26, 56, 66, 76, 86 End face
28 Internal projection
29, 149 Deformed portion
110, 120 Rigid wall
130 Compressing direction
200 Joined cylindrical body
201 Lid
202 Flange portion
202a Hole
203 Welded portion

The invention claimed is:

1. An energy absorbing member comprising:
a joined cylindrical body formed of an aluminum alloy material,
the joined cylindrical body including, in a cross section perpendicular to an axial direction of the aluminum alloy material,
a substantially quadrangular outer wall,
arcuate first internal projections projecting inward from four corners of the outer wall,
arcuate second internal projections projecting inward to segment each of straight portions of a pair of long sides of the outer wall into a plurality of sides, and
ribs that join vertices of the second internal projections opposing each other,
wherein when applied with a compressive load in the axial direction, the joined cylindrical body buckles and deforms continuously.

2. The energy absorbing member according to claim 1, wherein
- the joined cylindrical body further includes a third internal projection that is a part of the outer wall projecting inward, and
- the third internal projection is located at a position of a wavelength which is ½ to one times a wavelength of an initial buckling from one end face of the outer wall, which serves as a compression surface, in the axial direction, and extends in a widthwise direction perpendicular to the axial direction.

3. The energy absorbing member according to claim 1, wherein
- a distance between the ribs adjacent to each other is greater than a distance between straight portions of short sides of the outer wall and the ribs.

4. The energy absorbing member according to claim 1, wherein a radius of an arc of the first internal projection is larger than a radius of an arc of the second internal projection.

5. The energy absorbing member according to claim 1, wherein one of end portions of the joined cylindrical body in the axial direction is sealed.

6. The energy absorbing member according to claim 1, wherein a flange portion is formed at the one of end portions in the axial direction.

* * * * *